US011831372B2

(12) United States Patent
Branlund

(10) Patent No.: US 11,831,372 B2
(45) Date of Patent: *Nov. 28, 2023

(54) NON-LINE OF SIGHT WIRELESS COMMUNICATION SYSTEM AND METHOD

(71) Applicant: Tarana Wireless, Inc., Santa Clara, CA (US)

(72) Inventor: Dale Branlund, Portola Valley, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/589,019

(22) Filed: Sep. 30, 2019

(65) Prior Publication Data

US 2020/0106499 A1 Apr. 2, 2020

Related U.S. Application Data

(63) Continuation of application No. 15/012,615, filed on Feb. 1, 2016, now Pat. No. 10,432,275, which is a continuation of application No. 13/445,861, filed on Apr. 12, 2012, now Pat. No. 9,325,409, and a continuation of application No. 13/445,863, filed on
(Continued)

(51) Int. Cl.
| H04B 7/06 | (2006.01) |
| H04J 14/00 | (2006.01) |
| H04J 1/00 | (2006.01) |
| H01Q 3/26 | (2006.01) |
| H04B 7/08 | (2006.01) |

(52) U.S. Cl.
CPC ......... *H04B 7/0617* (2013.01); *H01Q 3/2605* (2013.01); *H04B 7/086* (2013.01); *H04J 1/00* (2013.01); *H04J 14/00* (2013.01)

(58) Field of Classification Search
USPC ........................................................ 370/329
See application file for complete search history.

(56) References Cited

U.S. PATENT DOCUMENTS

| 5,889,814 A | 3/1999 | Simmons |
| 6,122,260 A | 9/2000 | Hui et al. |
(Continued)

FOREIGN PATENT DOCUMENTS

| EP | 2071745 | 2/2011 |
| EP | 1865642 | 1/2017 |
(Continued)

OTHER PUBLICATIONS

Clark, Martin V., entitled, "Adaptive Frequency-Domain Equalization and Diversity Combining for Broadband Wireless Communications" IEEE Journal, (Oct. 1998), 11 pp.
(Continued)

*Primary Examiner* — Gregory B Sefcheck
*Assistant Examiner* — Majid Esmaeilian
(74) *Attorney, Agent, or Firm* — Stoel Rives LLP

(57) ABSTRACT

A non-line of sight backhaul system and method are described that provides self-alignment of the antennas beams of the wireless radios of the system, that provides robust operation in licensed and unlicensed frequency bands, that facilitates the use of a reduced number of frequency channels from M to 1 and that enables operation in a non-line of sight (NLOS) propagation environment.

50 Claims, 10 Drawing Sheets

Macro-cellular architecture    Micro-cellular architecture

Related U.S. Application Data

Apr. 12, 2012, now Pat. No. 9,252,908, and a continuation of application No. 13/445,869, filed on Apr. 12, 2012, now Pat. No. 9,456,354.

(56) References Cited

U.S. PATENT DOCUMENTS

| | | |
|---|---|---|
| 6,219,561 B1 | 4/2001 | Raleigh |
| 6,289,062 B1 | 9/2001 | Wang et al. |
| 205,493 A1 | 1/2002 | Majidi-Ahy |
| 6,580,328 B2 | 6/2003 | Tan et al. |
| 6,771,985 B1 | 8/2004 | Linuma |
| 6,795,424 B1 | 9/2004 | Kapoor et al. |
| 6,865,169 B1 | 3/2005 | Quayle et al. |
| 7,003,310 B1 | 2/2006 | Youssefmir et al. |
| 7,054,292 B2 | 5/2006 | Hall et al. |
| 7,155,183 B2 | 12/2006 | Abraham |
| 7,187,723 B1 | 3/2007 | Kawanabe |
| 7,333,455 B1 | 2/2008 | Bolt et al. |
| 7,340,279 B2 | 3/2008 | Chen et al. |
| 7,366,120 B2 | 4/2008 | Handforth et al. |
| 7,469,152 B2 | 12/2008 | Cetiner et al. |
| 7,493,129 B1 | 2/2009 | Mostafa et al. |
| 7,502,355 B2 | 3/2009 | Bednekoff et al. |
| 7,567,543 B2 | 7/2009 | Cao et al. |
| 7,603,081 B2 | 10/2009 | Karabinis |
| 7,636,552 B2 | 12/2009 | Monk |
| 7,640,020 B2 | 12/2009 | Gutowski |
| 7,646,752 B1 | 1/2010 | Periyalwar et al. |
| 7,688,739 B2 | 3/2010 | Frei et al. |
| 7,693,482 B2 | 4/2010 | Eade |
| 7,720,444 B2 | 5/2010 | Darabi et al. |
| 7,839,856 B2 | 11/2010 | Sinha et al. |
| 7,953,389 B2 | 5/2011 | Coleman et al. |
| 8,195,224 B2 | 6/2012 | Saban et al. |
| 8,238,318 B1 | 8/2012 | Kegus |
| 8,340,235 B2 | 12/2012 | Mohammad et al. |
| 8,416,872 B2 | 4/2013 | Higuchi et al. |
| 8,488,728 B2 | 7/2013 | Mohammad et al. |
| 8,502,733 B1 | 8/2013 | Negus et al. |
| 8,531,471 B2 | 9/2013 | Chen et al. |
| 8,654,815 B1 | 2/2014 | Forenza et al. |
| 8,670,390 B2 | 3/2014 | Shattil |
| 8,811,348 B2 | 8/2014 | Rangan et al. |
| 8,837,305 B2 | 9/2014 | Nanda et al. |
| 9,124,381 B2 | 9/2015 | Karabinis et al. |
| 9,131,529 B1 | 9/2015 | Ayyagari et al. |
| 9,252,908 B1 | 2/2016 | Branlund |
| 9,325,409 B1 | 4/2016 | Branlund |
| 9,332,465 B2 | 5/2016 | Valliappan et al. |
| 9,356,358 B2 | 5/2016 | Chang et al. |
| 9,386,465 B2 | 7/2016 | Forenza et al. |
| 9,456,354 B2 | 9/2016 | Branlund |
| 9,502,022 B2 | 11/2016 | Chang et al. |
| 9,735,940 B1 | 8/2017 | Bakr et al. |
| 9,819,083 B1 | 11/2017 | Chen |
| 9,853,668 B2 | 12/2017 | Corbalis et al. |
| 9,854,408 B2 | 12/2017 | Suthar et al. |
| 9,923,657 B2 | 3/2018 | Forenza et al. |
| 9,973,246 B2 | 5/2018 | Forenza et al. |
| 10,056,963 B1 | 8/2018 | Au |
| 10,164,698 B2 | 12/2018 | Forenza et al. |
| 10,181,330 B2* | 1/2019 | Han ............... G01S 3/8055 |
| 10,348,394 B1 | 7/2019 | Bakr et al. |
| 10,432,275 B2 | 10/2019 | Branlund |
| 11,025,394 B1 | 6/2021 | Bakr et al. |
| 11,115,111 B1 | 9/2021 | Bakr et al. |
| 2001/0028675 A1 | 10/2001 | Bierly |
| 2002/0042290 A1 | 4/2002 | Williams et al. |
| 2002/0154687 A1* | 10/2002 | Bierly ............... H04B 7/086 |
| | | 375/222 |
| 2003/0035468 A1 | 2/2003 | Corbaton et al. |
| 2003/0228887 A1* | 12/2003 | Kishigami ........... H04B 1/7113 |
| | | 455/562.1 |
| 2004/0142701 A1 | 7/2004 | Abraham |
| 2004/0192199 A1 | 9/2004 | Eade |
| 2004/0264393 A1 | 12/2004 | Desgagne et al. |
| 2005/0078038 A1 | 4/2005 | Takaki |
| 2005/0141624 A1 | 6/2005 | Lakshmipathi et al. |
| 2005/0245192 A1 | 11/2005 | Karabinis et al. |
| 2006/0040615 A1 | 2/2006 | Mohamadi |
| 2006/0119440 A1 | 6/2006 | Isobe et al. |
| 2006/0135070 A1 | 6/2006 | Karabinis |
| 2006/0268769 A1 | 11/2006 | Pan |
| 2006/0280116 A1* | 12/2006 | Ji ..................... H04B 7/0617 |
| | | 370/329 |
| 2006/0292990 A1 | 12/2006 | Karabinis |
| 2007/0052353 A1 | 3/2007 | Yang et al. |
| 2007/0058584 A1 | 3/2007 | Sutskover |
| 2007/0087690 A1 | 4/2007 | Karabinis |
| 2007/0082142 A1 | 7/2007 | Classon et al. |
| 2008/0076477 A1* | 3/2008 | Hedayat ............. H04B 7/0617 |
| | | 455/562.1 |
| 2008/0117101 A1 | 5/2008 | Pan |
| 2008/0130496 A1 | 6/2008 | Kuo et al. |
| 2008/0214196 A1 | 9/2008 | Sambhwani |
| 2008/0214218 A1 | 9/2008 | Lakshmanan |
| 2008/0233967 A1 | 9/2008 | Montojo et al. |
| 2008/0247388 A1 | 10/2008 | Horn |
| 2008/0261602 A1 | 10/2008 | Livneh |
| 2008/0278394 A1 | 11/2008 | Koh et al. |
| 2008/0317014 A1 | 12/2008 | Veselinovic et al. |
| 2009/0052353 A1 | 2/2009 | D et al. |
| 2009/0110033 A1 | 4/2009 | Shattil |
| 2009/0185632 A1 | 7/2009 | Cai et al. |
| 2009/0310693 A1 | 12/2009 | Baker et al. |
| 2009/0316675 A1 | 12/2009 | Malladi |
| 2010/0035620 A1 | 2/2010 | Naden et al. |
| 2010/0046595 A1 | 2/2010 | Sikri et al. |
| 2010/0048217 A1 | 2/2010 | Deshpande et al. |
| 2010/0056059 A1 | 3/2010 | Lakshmanan et al. |
| 2010/0067476 A1 | 3/2010 | Periyalwar et al. |
| 2010/0087149 A1 | 4/2010 | Srinivasan et al. |
| 2010/0093391 A1 | 4/2010 | Saban et al. |
| 2010/0195619 A1 | 8/2010 | Bonneville et al. |
| 2010/0215032 A1 | 8/2010 | Jalloul et al. |
| 2010/0248644 A1 | 9/2010 | Kishi et al. |
| 2010/0254295 A1 | 10/2010 | Ahn et al. |
| 2010/0296459 A1 | 11/2010 | Miki et al. |
| 2011/0034200 A1 | 2/2011 | Leabman |
| 2011/0039509 A1 | 2/2011 | Bruchner |
| 2011/0051731 A1 | 3/2011 | Mang et al. |
| 2011/0075601 A1 | 3/2011 | Zheng |
| 2011/0105054 A1 | 5/2011 | Cavin et al. |
| 2011/0142025 A1 | 6/2011 | Agee |
| 2011/0211615 A1 | 9/2011 | Hamamura |
| 2011/0269410 A1 | 11/2011 | Tsujimoto et al. |
| 2011/0274032 A1 | 11/2011 | Leng et al. |
| 2012/0094679 A1 | 4/2012 | Rao et al. |
| 2012/0108257 A1 | 5/2012 | Kwon et al. |
| 2012/0129539 A1 | 5/2012 | Arad et al. |
| 2012/0136670 A1* | 5/2012 | Ishikawa ............. G10L 21/038 |
| | | 704/500 |
| 2012/0202546 A1 | 8/2012 | Nakayama et al. |
| 2012/0294203 A1 | 11/2012 | Koorapaty et al. |
| 2012/0319844 A1 | 12/2012 | Van Doorn |
| 2013/0044028 A1 | 2/2013 | Lea et al. |
| 2013/0094522 A1 | 4/2013 | Moshfeghi |
| 2013/0095747 A1 | 4/2013 | Moshfeghi |
| 2013/0109372 A1 | 5/2013 | Ekici |
| 2013/0142136 A1 | 6/2013 | Pi et al. |
| 2013/0207841 A1* | 8/2013 | Negus ................. H01Q 21/065 |
| | | 342/359 |
| 2013/0237261 A1 | 9/2013 | Bazzi |
| 2013/0259113 A1 | 10/2013 | Kumar |
| 2013/0272132 A1 | 10/2013 | Heo et al. |
| 2013/0343356 A1 | 12/2013 | Bai et al. |
| 2014/0162667 A1 | 6/2014 | Mueck |
| 2014/0185496 A1 | 7/2014 | Wolf et al. |
| 2014/0206367 A1 | 7/2014 | Agee et al. |
| 2014/0269492 A1 | 9/2014 | Forenza et al. |
| 2014/0269502 A1 | 9/2014 | Forenza et al. |
| 2014/0328423 A1 | 11/2014 | Agee et al. |
| 2015/0085713 A1 | 3/2015 | He et al. |

(56) References Cited

U.S. PATENT DOCUMENTS

| | | | |
|---|---|---|---|
| 2015/0124713 A1 | 5/2015 | Salhov et al. | |
| 2015/0244458 A1 | 8/2015 | Erkmen | |
| 2016/0119052 A1 | 4/2016 | Frerking | |
| 2016/0134337 A1 | 5/2016 | Branlund | |
| 2016/0135060 A1 | 5/2016 | Branlund | |
| 2016/0255605 A1 | 9/2016 | Kyeong et al. | |
| 2016/0301458 A1* | 10/2016 | Petersson | H01Q 21/26 |
| 2016/0323894 A1* | 11/2016 | Shen | H04W 72/541 |
| 2017/0013476 A1 | 1/2017 | Suthar et al. | |
| 2017/0163325 A1 | 6/2017 | Kang et al. | |
| 2018/0249453 A1 | 8/2018 | Nagaraja et al. | |
| 2018/0262936 A1 | 9/2018 | Zhou et al. | |
| 2018/0279316 A1 | 9/2018 | Mueck et al. | |
| 2018/0287833 A1 | 10/2018 | Kennedy | |
| 2019/0068235 A1 | 2/2019 | Branlund | |
| 2022/0029697 A1 | 1/2022 | Bakr | |

FOREIGN PATENT DOCUMENTS

| | | |
|---|---|---|
| EP | 1865642 A1 | 12/2017 |
| GB | 2350265 | 11/2000 |
| JP | 2010-522516 | 7/2010 |
| JP | 2010-525678 | 7/2010 |
| JP | 2010-183573 | 8/2010 |
| PT | 1858175 E | 9/2012 |
| WO | 9820633 A2 | 5/1998 |
| WO | 199820633 | 5/1998 |
| WO | 205493 | 1/2002 |
| WO | 0205493 A2 | 1/2002 |
| WO | 2063896 | 8/2002 |
| WO | 02063896 A1 | 8/2002 |
| WO | 2005101882 | 10/2005 |
| WO | 2007082142 | 7/2007 |
| WO | 2008033369 | 3/2008 |
| WO | 2009119463 | 10/2009 |
| WO | 2010003509 | 1/2010 |
| WO | 2010013245 | 2/2010 |
| WO | 2012037643 | 3/2012 |

OTHER PUBLICATIONS

Savvides, Andreas et al., entitled, "The Bits and Flops of the N-hop Multilateration Primitive for Node Localization Problems" UCLA, (Sep. 28, 2002), 10 pp.

"Echo Cancellation and Channel Estimation for On-Channel Repeaters in DVB-T/H Networks" by Karim M. Nasr et al.; Brunel University; dated after Jan. 2006 (6 pgs.).

"Load- and Interference-Aware Channel Assignment for Dual-Radio Mesh Backhauls" by Michelle X. Gong et al.; IEEE Communications Society; dated 2008 (6 pgs.).

"Signal Acquisition and Tracking with Adaptive Arrays in the Digital Mobile Radio System IS-54 with Flat Fading" by Jack H. Winters; IEEE Transactions; dated Nov. 4, 1993 (8 pgs.).

Communication pursuant to Article 94(3) EPC dated Sep. 1, 2021 in connection with European patent application No. 16153704.8, 11 pages., Sep. 1, 2021.

Clark, Martin V., "Adaptive Frequency-Domain Equalization and Diversity Combining for Broadband Wireless Communications", IEEE Journal vol. 16, No. 8, Oct. 1998, pp. 1385-1395.

Clark, Martin V., "Adaptive Frequency-Domain Equalization and Diversity Combining for Broadband Wireless Communications", IEEE Transactions on Vehicular Technology vol. 42, No. 4, Oct. 1998, pp. 1385-1395.

Clark, Martin V., "Adaptive Frequency-Domain Equalization and Diversity Combining for Broadband Wireless Communications", IEEE Journal vol. 16, No. 8, Oct. 1998, pp. 377-384.

Gong, Michelle X, et al., "Load- and Interference-Aware Channel Assignment for Dual-Radio Mesh Backhauls", IEEE Communications Society, 2008, pp. 1-8.

Mesecher, Mesecher, David. "A physical layer open architecture for communications systems integration: common baseband processor with multiple-access adaptively steered antenna array." IEEE, 2008, 10 pages., May 2, 2008.

Nasr, Karim, et al., "Echo Cancellation and Channel Estimation for OnChannel Repeaters in DVB-T/H Networks", Brunel University: School of Engineering and Design, Dec. 3, 2019, pp. 1-8.

Nasr, Karim M., et al., "Echo Cancellation and Channel Estimation for OnChannel Repeaters in DVB-T/H Networks", Brunel University: School of Engineering and Design, Dec. 3, 2019, pp. 1-8.

Savvides, Andreas, et al., "The Bits and Flops of the N-hop Multilateration Primitive for Node Localization Problems", UCLA Networked and Embedded Systems Lab Electrical Engineering Department, Sep. 28, 2002, pp. 1-10.

Winters, Jack H., "Signal Acquisition and Tracking With Adaptive Arrays in the Digital Mobile Radio System IS-54 with Flat Fading", IEEE Transactions on Vehicular Technology vol. 42, No. 4, Nov. 4, 1993, pp. 377-384.

EP Examination Report for EP Application 16153704.8 dated Sep. 1, 2021, pp. 11.

Extended European Search Report for EP Application 16153704.8 dated Aug. 16, 2016, pp. 11.

EP Examination Report for EP Application 16153704.8 dated Jun. 26, 2019, pp. 7.

Clark;, V. Martin, "Adaptive Frequency-Domain Equalization and Diversity Combining for Broadband Wireless Communications", IEEE Journal vol. 16 No. 8, Oct. 1998, pp. 1385-1395.

Gong, Michelle X., "Load- and Interference-Aware Channel Assignment for Dual-Radio Mesh Backhauls", IEEE Communications Society, 2008, pp. 1-6.

Nasr, Karim M., et al., "Echo Cancellation and Channel Estimation for On-Channel Repeaters in DVB-T/H Networks", Brunel University, Jan. 2006, pp. 1-6.

Savvides, Andreas, et al., "The Bits and Flops of the N-hop Multilateration Primitive for Node Localization Problems", UCLA, Sep. 28, 2002, pp. 1-10S.

Winters, Jack H., "Signal Acquisition and Tracking with Adaptive Arrays in the Digital Mobile Radio System IS-54 with Flat Fading"", IEEE Transactions, Nov. 4, 1993, pp. 377-384.

* cited by examiner

NON-LINE OF SIGHT WIRELESS COMMUNICATION SYSTEM AND METHOD

PRIORITY CLAIMS/RELATED APPLICATIONS

This application claims priority under 35 U.S.C. § 120 and is a continuation of U.S. patent application Ser. No. 15/012,615 filed on Feb. 1, 2016 and entitled "Non-Line of Sight Wireless Communication System and Method", (now U.S. Pat. No. 10,432,275, issued on Oct. 1, 2019) which claims priority under 35 U.S.C. § 120 and is a continuation of U.S. patent application Ser. No. 13/445,863, filed on Apr. 12, 2012 and entitled "Non-Line of Sight Wireless Communication System and Method", now U.S. Pat. No. 9,252,908 issued on Feb. 2, 2016), U.S. patent application Ser. No. 13/445,869, filed on Apr. 12, 2012 and entitled "Non-Line of Sight Wireless Communication System and Method" (now U.S. Pat. No. 9,456,354 issued on Sep. 27, 2016) and U.S. patent application Ser. No. 13/445,861, filed on Apr. 12, 2012 and entitled "Non-Line of Sight Wireless Communication System and Method" (now U.S. Pat. No. 9,325,409 issued on Apr. 26, 2016), all of which are incorporated herein by reference.

FIELD

The disclosure relates a wireless backhaul system that uses non-line of sight wireless communications and the non-line of sight wireless communications system and method.

BACKGROUND

A backhaul system is a communication system that is used to communicate certain data from a cellular network, for example, back to the central system in a communications system. Various different backhaul systems are well known that are both wireless communication systems and wired communication systems. Most of the current wireless backhaul systems are point to point (P2P) systems that operate in the licensed FDD (frequency division multiplexed or a frequency division protocol) microwave bands from 6 GHz to 80 GHz. These systems use high gain parabolic dishes which must be manually pointed and also rely on the low sidelobe performance of the dish to reduce (but not eliminate) co-channel interference. Moreover, these products must be used where line-of-sight is available.

These existing backhaul systems do not provide self alignment and realignment of the antenna beams or any increase in effective link spectral efficiency by using interference cancellation. These existing systems also do not operate in a non-line-of sight propagation environment, are not able to double the spectral efficiency by using two polarizations in this environment and have reduced link reliability due to fading. These existing systems do not cancel radio interference to optimize signal to interference and noise ratio (SINR) and do not cancel interference from other self-generated co-channel interference. These existing systems also do not have multi-target beam-forming that enhances spectral efficiency and can provide exceptional data concentration in small amounts of spectrum.

Furthermore, given the shortage of spectrum for broadband wireless and the need to increase both link rate and network capacity, wireless carriers are migrating from a traditional macro-cellular network topology 10 to a micro-cellular and pico-cellular topologies 20 as shown in FIG. 1. That is, instead of using a few high-high powered base-stations to cover large areas, they supplement these with many outdoor micro-cells and pico-cells as shown in FIG. 1.

The base station capacity (measured in Mbps) has been increasing slowly as operators migrate from 2.5G and 3G technologies (HSDPA, HSPA, CDMA 2000, CDMA EVO, etc) to 4G technologies (WiMax and LTE). However, 4G technology increases spectral efficiency only 50% relative to the previous generation. Yet, 4G will not solve the 10-fold increase needed to maintain a macro-cell topology while increasing user capacity. Hence, emerging wireless architectures solve the throughput problem by increasing "capacity density" (measured in Mbps per $km^2$), and not by increasing capacity alone.

Increasing capacity density 10-fold can be solved by a dense deployment of micro- and pico-cells. Although these cells have limited range (100 to 500 meters), they retain the capacity similar to macro-cells, for the LTE standard 15 Mbps in 10 MHz of bandwidth and 39 Mbps in 10 MHz of bandwidth with 3-sectored implementations. Thus, a macro-cell with a range of 1 km (urban propagation) and capacity density of 15 $Mbps/km^2$, evolves into a micro-cellular topology featuring a capacity density of 135 $Mbps/km^2$ using 9 micro-cells.

Thus, it is desirable to provide a non-line of sight backhaul system and method that overcomes the above limitations of existing backhaul systems and it is to this end that the disclosure is directed.

DETAILED DESCRIPTION OF ONE OR MORE EMBODIMENTS

The disclosure is particularly applicable to a wireless non-line of sight backhaul system and method described below and it is in this context that the disclosure will be described. It will be appreciated, however, that the system and method has greater utility since the wireless non-line of sight backhaul system and method can be implemented in other manners that are within the scope of the disclosure.

The system is a wireless, non-line of sight backhaul system that enables self alignment and realignment of the antennas beams of the wireless radios of the system, that provides robust operation in licensed and unlicensed frequency bands, that facilitates the use of a reduced number of frequency channels from M to 1 and that enables operation in a non-line of sight (NLOS) propagation environment. The system may provide an increase in effective link spectral efficiency by using Extreme Interference Cancellation (EIC) and up to double the spectral efficiency by using two polarizations. The system also provides an improvement in link reliability by reducing fading. The system also cancels the radio interference to optimize signal to interference and noise ratio (SINR) and cancels interference from other self-generated co-channel interference. The system can be operated in a line of sight, near line of sight and non-line of sight radio frequency (RF) propagation environments. The system also provides multi-target beam-forming that enhances spectral efficiency and can provided exceptional data concentration in small amounts of spectrum. The non-line of sight system described below may be use a single radio frequency channel to support the wireless backhaul requirements of a carrier. Now, an implementation of the system is described in more detail.

Figure 1:
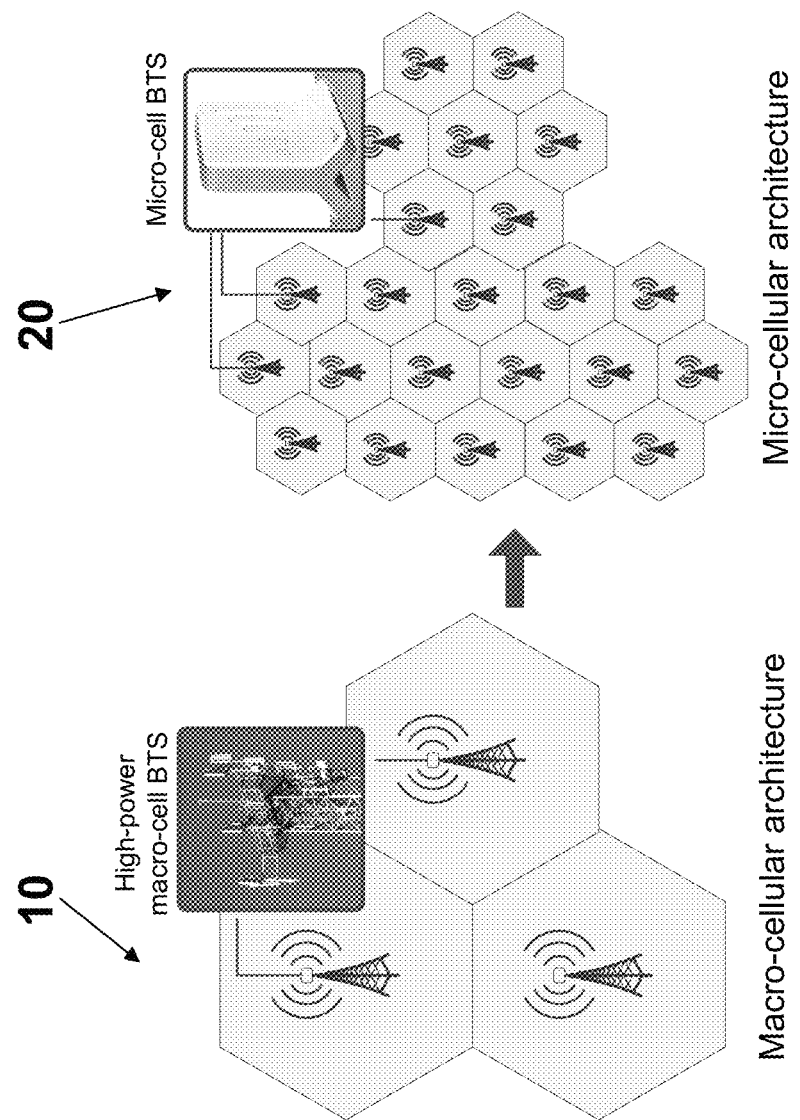
FIG. 1 illustrates a typical backhaul system migration from macro-cells.
Figure 2:
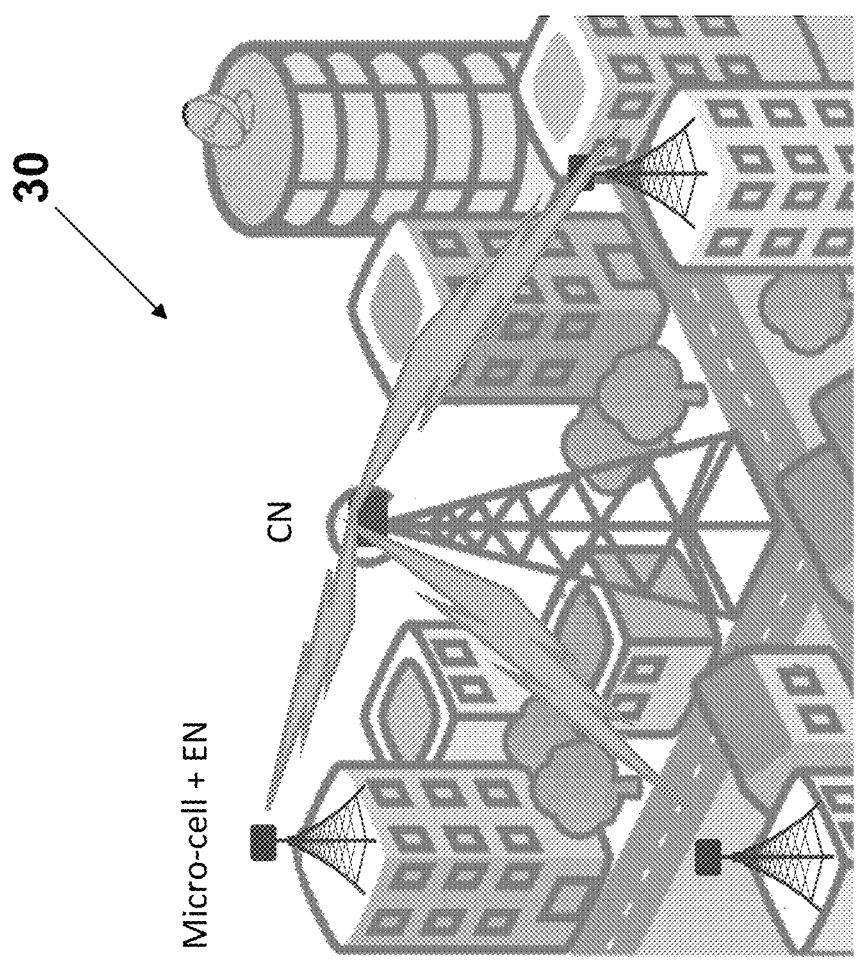
FIG. 2 illustrates an example of a non-line of sight system such as a non-line of sight, point to multipoint backhaul star architecture system.

FIG. 2 illustrates an example of a non-line of sight system 30 such as a non-line of sight, point to multipoint backhaul star architecture system. In one implementation, the non-line of sight system has a star topology with a point-to-concentrating multipoint (P2CMP) connectivity that has two types of wireless nodes: concentrator backhaul radios (CBRs) and terminating backhaul radios (TBRs). The non-line of sight system 30 may also have a point to point architecture, a multiple point to point architecture and a point to multipoint architecture. Each node in this wireless architecture may be referenced simply as concentrator nodes (CN) and end nodes (EN) evocative of their positions in the network. Each concentrator node aggregates traffic from L full bandwidth TBRs with capacity Q for a total of L*Q bps. Note that the P2CMP also embodies the notion of $L*L_{sb}$ TBRs links with capacity $Q/L_{sb}$ connected to the CBR where $L_{sb}$ is the number of subbands using either frequency division multiplexing (FDM) or time division multiplexing (TDM). Each TBR is attached to the micro or pico base station thus providing wireless backhaul connectivity. The physical connection with the TBR is via the native output of the base station.

Figure 3:
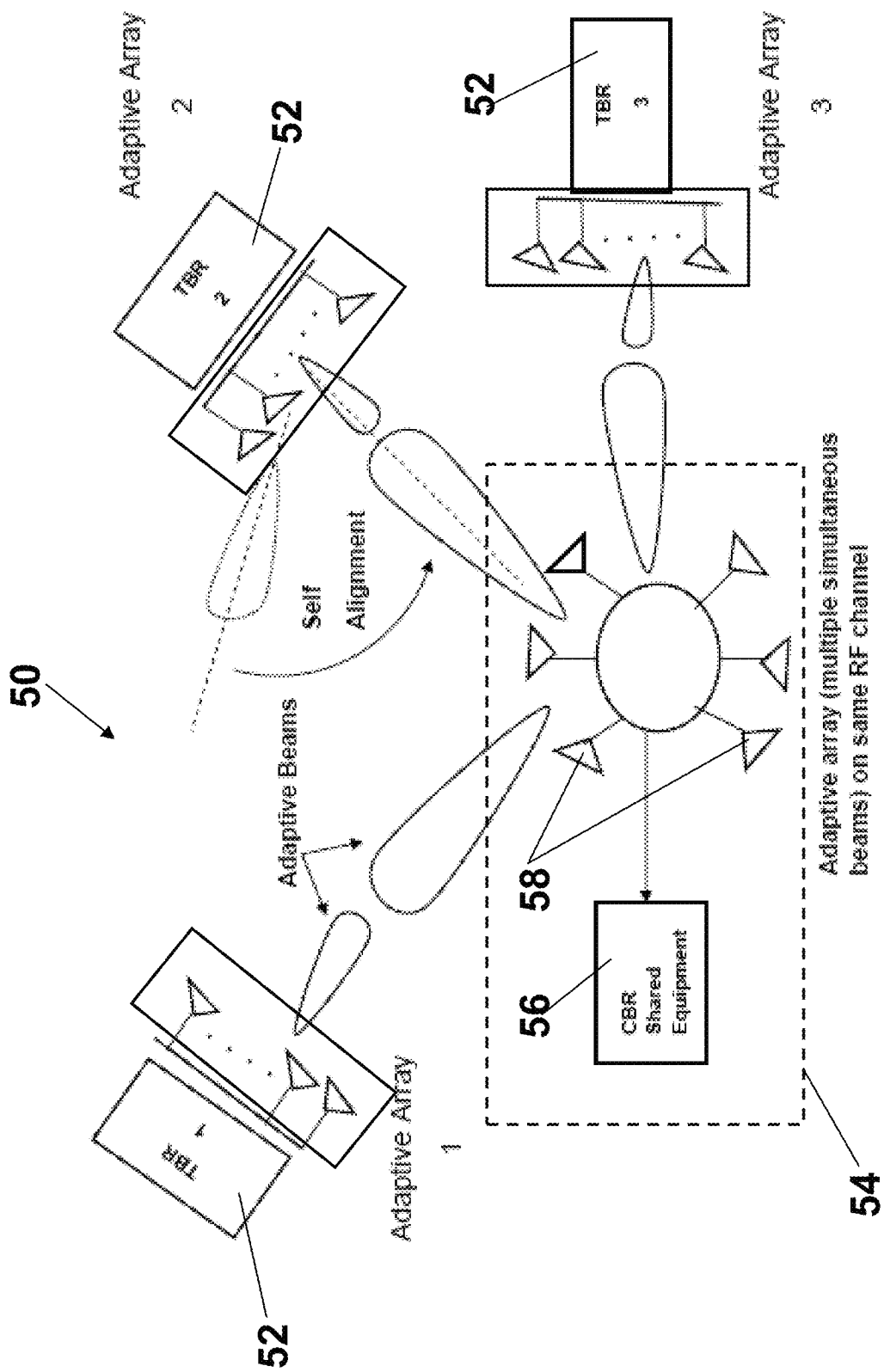
FIG. 3 illustrates an example of an implementation of a wireless non-line of sight backhaul system.

FIG. 3 illustrates an example of an implementation of a wireless non-line of sight backhaul system 50. The system has one or more links (microwave or RF links) terminated at a central backhaul radio 54 (CBR). In one example, the system has M links where M is a number greater than 1. Each link is comprised of a termination backhaul radio 52 (TBR) and 1/Mth of the CBR with a data capacity of Q bps per link where Q is a predetermined number that ranges from 1 to 15 bps. The data capacity measured at the CBR 54 is M*Q bps. Each link is comprised of a shared adaptive array 58 at the CBR 54 and one or more directional antennas 60 at each TBR. Optionally, the antenna at each TBR can be realized with an adaptive array. If each TBR has an adaptive array, then the TBR will self align its antenna pattern to the CBR. This is accomplished by computing the array's beam-forming weights using the frame start preamble (FSP) of the CBR as a reference. The weights may be computed from the Weiner equation using the array covariance matrix and the cross-correlation of the data with the FSP. Alternately, known reference symbols in the CBR may be used instead of the FSP as the desired signal. For all TBR antenna types, the CBR will self align its antenna pattern to all of the TBRs. When adaptive arrays are used for both the CBR and TBRs, the CBR and TBR adaptive arrays seek to maximize the signal-to-interference and noise ratio (SINR) by pointing an antenna beam toward the other end of the link, and by reducing interference by directing spatial nulls of the array toward these sources of link degradation.

In more detail, the wireless backhaul system 50 may have an architecture as shown in FIG. 3 which there is a central/concentrating backhaul radio (CBR) 54 that is communicating with up to 10 terminating backhaul radios (TBRs) 52 and each of the TBRs may be located adjacent a picocell and provide a connection between the picocell and the network as a backhaul network. In more detail, a wireless backhaul is used to connect wireless base stations to the core network and/or the operator's point-of-presence and facilitates the backhaul connection of all types of base stations, including femto, pico, micro, mini, and macro base stations. Moreover, this same technology is effective in wireless broadband bridging and last mile extensions of copper, cable and fiber plant. The wireless backhaul system described herein is able to handle the capacity requirements of 3G systems, 4G systems and future wireless protocols (including wireless data protocols.)

The CBR 54 may further comprise an adaptive antenna array 58 (that permit multiple simultaneous beams of the same channel) and a piece of CBR shared equipment 56. The CBR 54 can handle multiple simultaneous beams using the same channel because the system is able to perform extreme interference cancellation to eliminate interference between the various TBR signals. In this invention, this is accomplished by directing spatial nulls in the array antenna pattern in the directions of all interfering TBR while forming a beam peak in the direction of the desired TBR. Moreover, this process is replicated for each desired TBR connected to the CBR thus forming multiple beams and mutual spatial nulling that cancels interference. In conventional PtMP systems, the CBR-like hub can usually handle multiple beams, but those beams each use separate RF channels which wastes bandwidth.

While the maximum SINR optimization criterion is described above, other criteria also may be used (e.g. max SIR beamforming or non-linear data direction beamforming). Of particular importance is an extreme interference cancellation (EIC) feature at each TBR 52 if a high order (6 to 256 elements) adaptive array is employed at the TBR 52 using the equations (E1) through (E23) and equation G1 described below. This feature enables a boost in the SINR from 10 dB to 25 dB nominally in typical system deployments. In addition, depending on the coding rate, EIC is projected to boost link capacity from 1-2 bps/Hz to over 5-6 bps/Hz. Furthermore, if dual polarizations are used, then the capacity can be increased by a factor of 2 (maximum).

Multi-target beamforming introduces a unique beam and interference nulling solution for each TBR 52. Thus, the CBR 54 issues M beams, one each to M TBRs. Each of these beams may use one of M separate frequency channels, or one of M separate subchannels within the overall channel. Alternately, the beams may use the same frequency channel. In the case in which the beams use the same frequency channel, the adaptive array eliminates the interference from the M−1 other beams using spatial nulling techniques. Alternately, the beams may use a combination of M/K channels or subchannels where K is integer sub-multiple of M. In this case, the adaptive array eliminates the interference from the M/K−1 other beams using spatial nulling techniques.

The non-line-of-sight backhaul operation involves angle and delay spread array processing to remove the effects of frequency selective channel responses due to multipath. This process is described using the channel model described in Equation (B1) through (B2) Moreover, it deals with multiple copies of the signal arriving from Q disparate angles of arrival. Conceptually, this involves creating a separate beamforming/null steering solution for each of Q signal paths at each delay spread value, then adaptive combining the Q outputs of the individual paths to optimize the SINR of the link. Two-dimensional beamforming in space for each time-delayed multipath is used. This may be implemented as a tapped delay line beamformer. Alternately, the beamforming operations may be realized efficiently by transforming the array signals between the frequency and time domains.

For the case of dual polarization, the 2 dimensional beamformer can operate on 2M antennas where M in the number of antennas with one polarization. Many algorithms as described above yield an optimal solution to this problem if all antennas/polarizations are used in the formulation.

Figure 4:
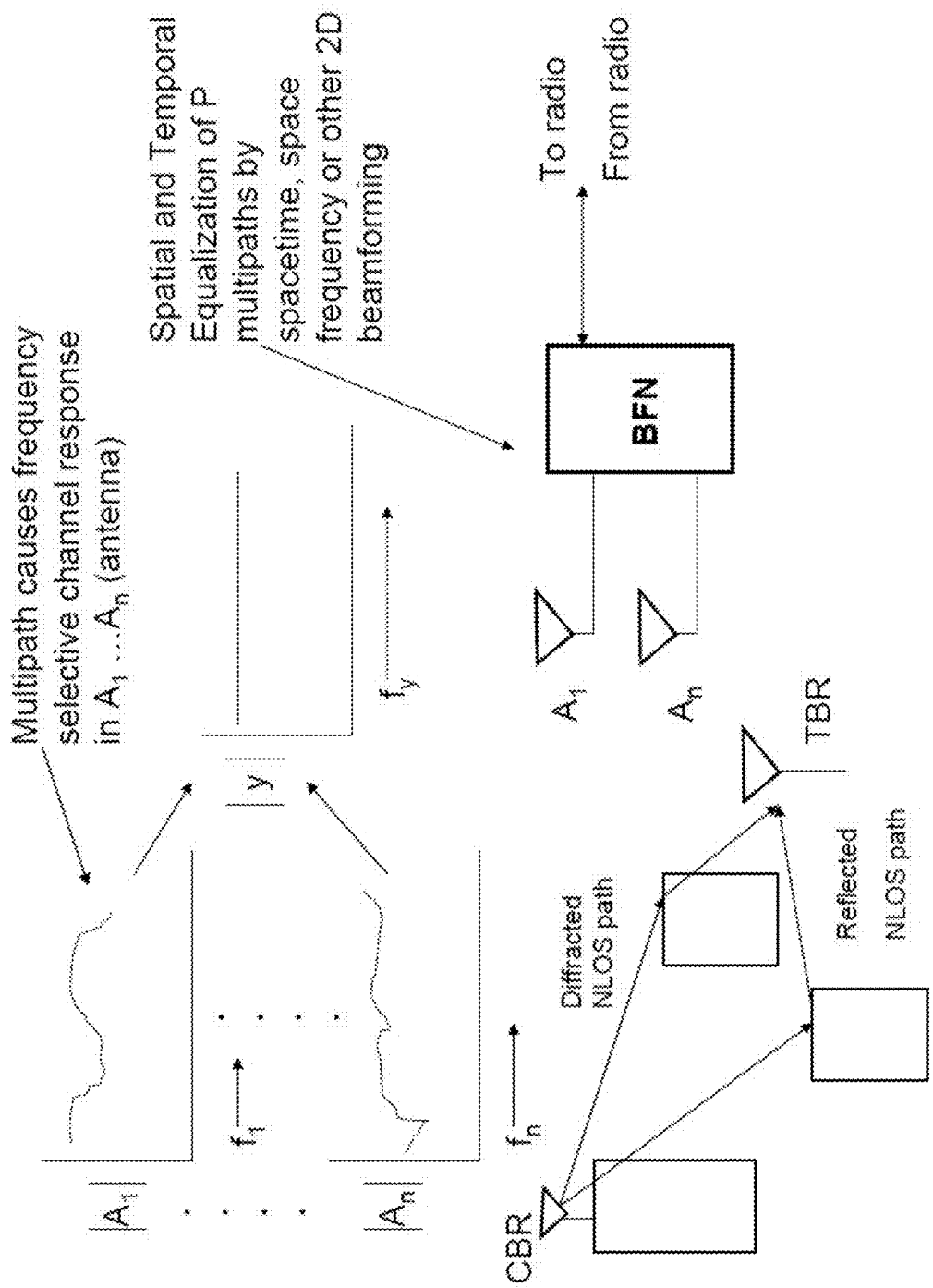
FIG. 4 illustrates details of the operation of the wireless non-line of sight backhaul system.

FIG. 4 illustrates details of the operation of the wireless non-line of sight backhaul system. As shown, a NLOS signal path (that may be diffracted or reflected) is used. Each TBR 52, using its adaptive antenna array (to receive multiple signals) and a beamformer (BFN), can perform spatial and temporal equalization of the various signals received by the antenna array ($A_1, \ldots, An$) to extract the signal from the multipath signals caused by the NLOS signal paths. This allows the wireless backhaul system to work without line of sight between the radios.

Beamforming and Interference Cancellation

Adaptive beamforming is used at both the CBR 54 and TBRs 52 to increase array gain and reduce interference. In adaptive beamforming, $N_1$ and $N_2$ antennas, respectively, are adaptively combined to yield the optimum signal-to-interference and noise (SINR) ratio at both ends of the link. Physically, a CBR adaptive beam is pointed in the direction of the TBR and the TBR points its adaptive beam back to the CBR as shown in FIG. 3. Moreover, $N_1$-1 spatial nulls (zeros) are directed at interference caused by other TBRs (managed interference) in the network while $N_2$-1 spatial nulls (zeros) are directed at interference caused by other CBRs. In practical systems, the number of antennas $N_1$ and $N_2$ can range from 2 to 256. By cancelling all interference, the desired link may achieve its highest capacity since it will be essentially noise limited rather that interference limited. Moreover, since a range of a link is now not interference limited but is dependent only on path loss to the TBR's location, the EIRP and the receiver's sensitivity are enhanced by the 2-dimensional beamforming gain at the TBR and CBR.

Automatic Beamsteering, in Changing Multipath Propagation and SINR Optimization

No special knowledge of the TBR's direction of arrival, location, or the interferers' directions of arrival is required to automatically point the optimized antenna beams between the TBR and CBR. Moreover, the adaptive beamforming solution optimizes the receiver SINR and may be updated rapidly to follow any temporal changes in the signal's angle of arrival, power levels, phase, time delay or other changes in the vector signature received on the array due to multipath or time-varying multipath. Special reference symbols embedded within the uplink and downlink transmission provide the signal structure so that algorithms can generate adaptive weights which cancel interference and direct beams even in time varying propagation channels without operator intervention. For example, those processes are described in Equations (C1) through (C23) for Space Time Adaptive Processing (STAP) and Equations (E1) through (E15d) through Space Frequency Adaptive Processing (SFAP).

Multi-Beam and Multiplicative Spectral Efficiency

Figure 5:
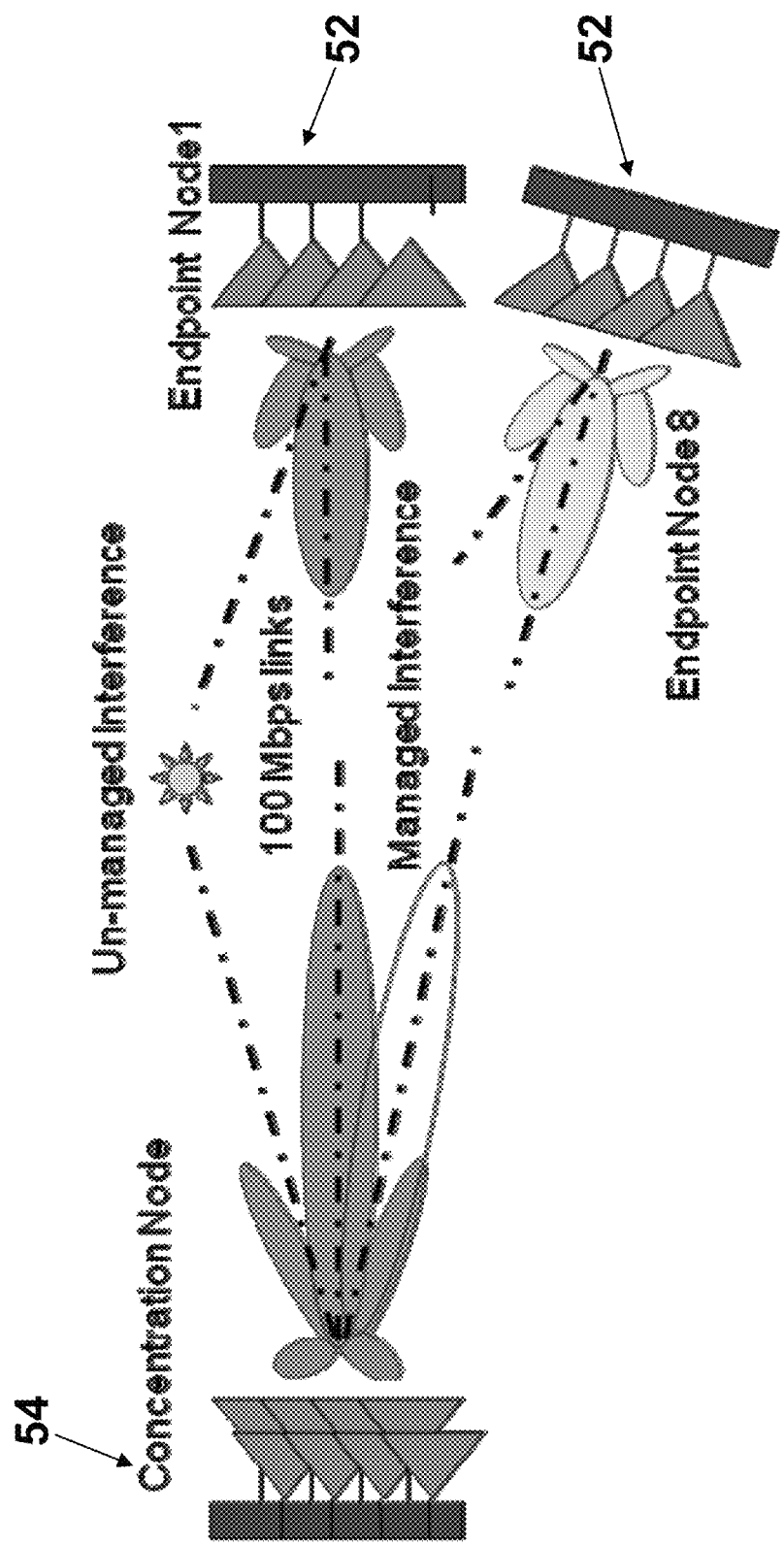
FIG. 5 illustrates a method for multiplicative spectral efficiency in the non-line of sight system.

FIG. 5 illustrates a method for multiplicative spectral efficiency in the non-line of sight system. In the system, Multi-beam array processing extends single beam beamforming by providing L simultaneous links to L TBRs 52 within the footprint of the CBR 54 using the same RF channel at full bandwidth. It accomplishes this by using at least N−1 spatial nulls per link to remove co-channel interference caused by other L−1 TBRs in attached to the CBR cell as shown in FIG. 5. In the system, each link optimizes SINR in the presence of the co-channel self-interference to maximize throughput.

If the system uses time-division duplexing (TDD or time division duplexing), the system described here will preserve the "null directions" in the downlink transmission by using a retro-directive computation of the array processing solution. As a result, TBRs experience no undesired interference from the other in-cell links and other out-of-cell CBRs. Thus, the downlink capacity is maximized for all in-cell links and out-of-cell CBRs.

Universal Frequency Reuse

TDD multi-beam array processing described above and used by the system has remarkable implications. For example, the capacity of the CBR has increased L-fold because the CBR now serves L times as many TBRs in any time epoch. Furthermore, the spectral efficiency is L times greater. This enables broadband backhaul to be deployable in modest amounts of spectrum. The system and method described herein supports an entire metro-area backhaul or BWA network with a single frequency channel, thus minimizing the need for large amounts of spectrum.

Figure 6:
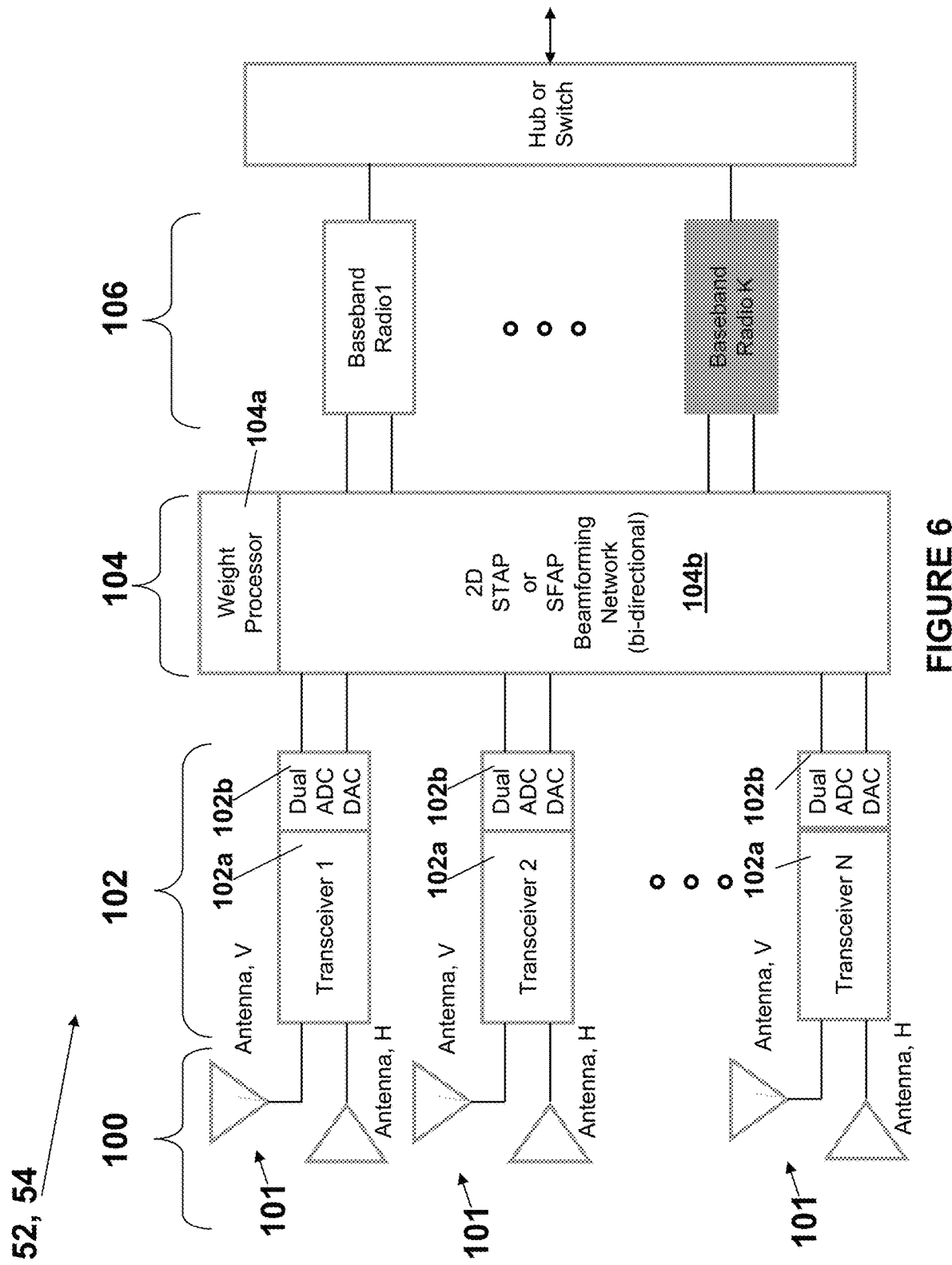
FIG. 6 illustrates an example of an implementation of both concentrating backhaul radio and the terminating backhaul radios of the system.

FIG. 6 illustrates an example of an implementation of both concentrating backhaul radio 54 and the terminating backhaul radios 52 of the system. In particular, both the CBR 54 and each TBR 52 has four subsystems including an antenna subsystem 100, a transceiver subsystem 102, a beamforming subsystem 104, such as a 2-dimensional beamforming system and a baseband radio subsystem 106.

The antenna subsystem 100 may comprise a plurality of antennas 101, such as $N_1$ as described above wherein $N_1$ is a predetermined number of antennas in the adaptive array for each TBR or $N_2$ antennas wherein $N_2$ is a predetermined number of antennas in the adaptive array for the CBR. Each antenna has 2 feed points that are orthogonal (or quasi-orthogonal). For example, the orthogonal (or quasi-orthogonal) feed points may be vertical/horizontal, left-hand-circular/right-hand-circular, or slant left/slant right as examples. The vertical/horizontal (V/H) feed points for each antenna are shown in FIG. 6. Each antenna may be passive or active. The antennas can be arrayed in a linear array, a two dimensional array or a 3-dimensional array. Example geometries of the antennas include flat panel, circular, semi-circular, square or cubic implementations. The antennas maybe placed in the array in an arbitrary fashion as well.

The transceiver subsystem 102 may further comprise a plurality of transceivers 102a, such as $N_1$ transceivers for each TBR and $N_2$ for the CBR, that provide one channel for each of the 2 polarization feeds from the associated antenna as shown in FIG. 6. Each transceiver channel provides a radio frequency (RF) receiver and an RF transmitter. Each transceiver 102a provides coherent or quasi-coherent down-conversion and up-conversion between RF and a complex baseband.

Each RF receiver in each transceiver may include a preselection filter, a low noise amplifier, a mixer, low pass filter and local oscillator to convert the RF signal down to the complex baseband in a well known manner. The complex baseband may be converted to digital in-phase and quadrature signals using two analog-to-digital converters in a converter unit 102b.

Each RF transmitter in each transceiver may include two digital-to-analog converters in the converter unit 102b, two low pass filters, a mixer and a local oscillator (LO) to convert the baseband signal to RF in a well known manner. For a TDD system, the LO can be shared between the receiver and the transmitter. The output of the mixer drives an RF preamplifier, transmit (Tx) filter and power amplifier completing the transmitter. The transmitter and receiver are connected to the antenna feed via a TR switch (TDD) or a diplexing filter (FDD).

The beamforming subsystem 104 may receive the signals from each of the transceivers as shown in FIG. 6. The beamforming subsystem may have a weigh processor 104a and a beamforming network (BFN) 104b that is implemented using a processor to perform the beamforming processes described below. In one implementation, a two dimensional (2D) space-time adaptive processing (STAP) or space-frequency adaptive processing (SFAP) bidirectional beam forming network may be used. The beamforming subsystem 104 is also connected to the baseband radio subsystem 106 that has a plurality of well known baseband radios (1 to K in FIG. 6) that are coupled to a hub or switch to route the data traffic.

Figure 7:
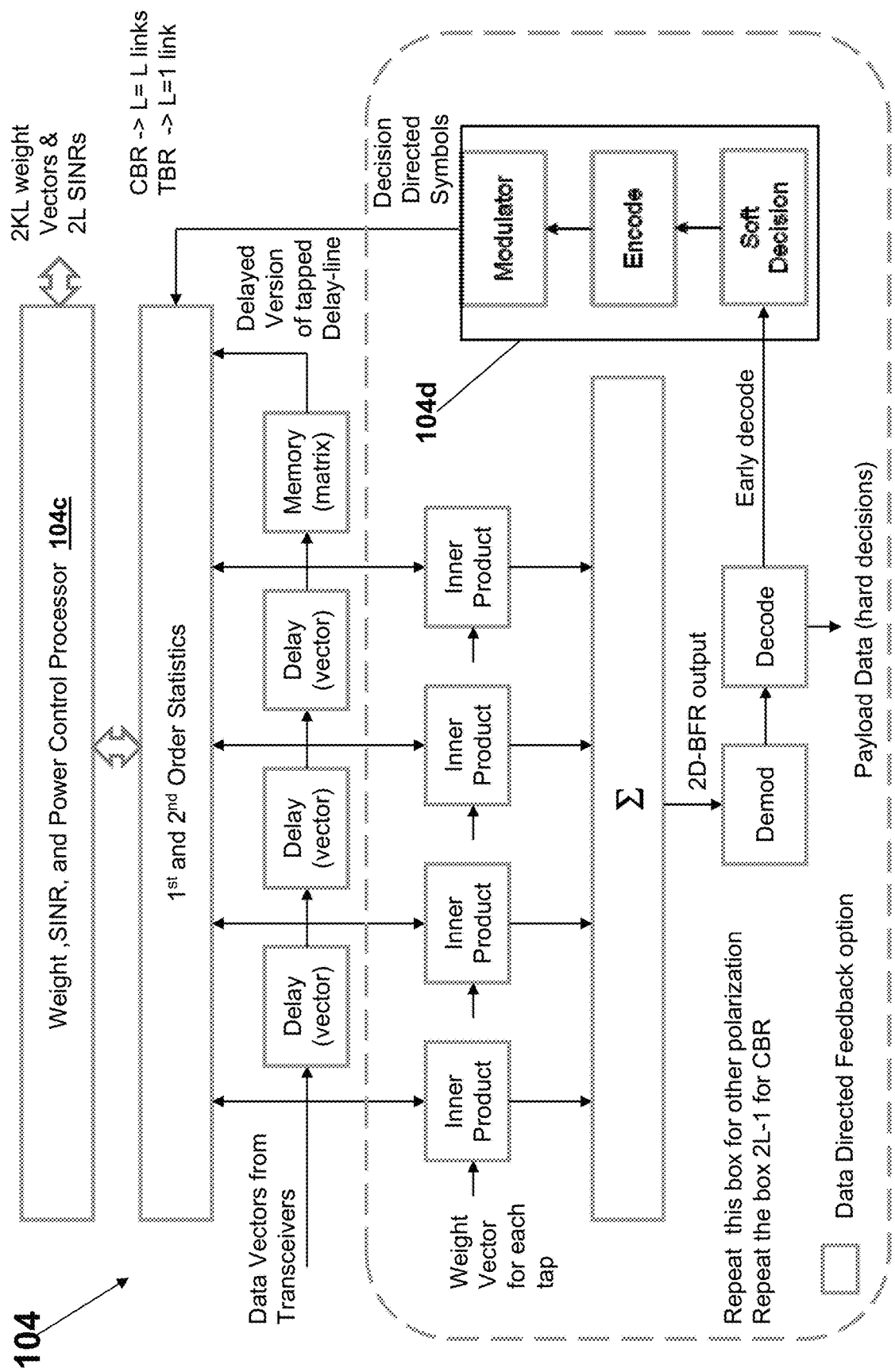
FIG. 7 illustrates an example of a 2-dimensional beam-forming network subsystem.

FIG. 7 illustrates an example of a 2-dimensional beamforming network subsystem 104. The subsystem is realized in the digital domain as a tapped-delayline for each antenna polarization. The output of each tapped delayline is summed with the outputs of the other delaylines for each antenna and polarization to form the output. Two 2D-BFNs are implemented, one for each polarization where the dimension of the 2D-BFNs are $2N_1 \times K$ where K is the number of taps. Note that FIG. 7 shows signal flow a receiver described above. For the transmitter, the signal flow is reversed through the beamformer 104.

The computation of the weights for the 2D-BFN is mechanized by the weight control processor 104c. The receiver signal vectors at the delay taps are made available to the processor in order to compute the complex weights at each tap. A number of optimal and near optimal algorithms are detailed in subsequent sections. The 2D-BFN may be implement in hardware (discrete logic, ASICs, SOCs), software (on a DSP, CPU or GPU), or firmware (e.g. FPGA). Note the 2D-BFN may be implemented in the analog domain at baseband, IF or RF.

At the CBR, two 2D-BFNs are implemented for each of the L TBRs attached to the CBR. In this case, $N_2$ antennas are processed. The dimension of the 2D-BRNs is $2N_2 \times K$ where K is the number of taps. In a more efficient CBR implementation, a pair of 2D-BRN of dimension $N_{2 \times} K$ may be used if the channel is reciprocal and the TBR uses a pair of $2N_2 \times K$ 2D-BRN.

The subsystem 104 may contain an optional data direction feedback circuit 104d. This circuit and its advantages will be described later in the description of the system.

Returning in FIG. 6, the baseband subsystem 106 may further comprise a dual channel baseband radio processor (BRP). The BRP is comprised of a physical layer, media access controller (MAC) and a network layer. The physical (PHY) layer implements modulation/demodulation, coding/decoding, encryption/decryption, and other PHY functions. The MAC provides frame building, scheduling, queuing, flow control, and layer 2 signaling. The network layer provides the interface between the core network and MAC implementing encapsulation, packet inspection, shaping, policing, and QoS mechanism. The BRP can be implemented with industry-wide radio standards such as GSM, W-CMDA, IEEE-802.16 and LTE or be implemented with a custom PHY and MAC.

Prorata Cost Advantage of the Point-to-Concentrating Multipoint Architecture

Traditional MW backhaul uses a point-to-point backhaul radio architecture. In the disclosed system, the point-to-concentrating multipoint (P2CMP) architecture shares the cost of all common CBR equipment such as antennas, transceivers, LNAs, PAs, filters, local oscillators, system control, backplanes, powering, and cabling cost over L TBRs with capacity Q per link, thus lowering the overall cost of each link. Traditional point to multipoint (P2MP) cannot make the same claim since the capacity per link is only Q/M. When P2MP is normalized to the capacity of Q bps per link, the cost per link is often higher that the P2P equivalent, or the spectral efficiency is degraded by a factor of L such that spectrum cost become prohibitive.

Simultaneous/Sequential Adaptive Array processing

The system described herein implements simultaneous array adaption of all TBRs receiving the desired downlink CBR signals and sequential adaption of each end of the link. Typically two independent data streams are transmitted on the vertical and horizontal arrays from the CBR. All TBRs compute receiver weight vectors $\vec{w}$ of the downlink that are applied to the TBR beamformers to estimate the downlink signals. The TBRs also estimate the SINR, $\vec{\gamma}$ for the data stream(s) and sends it to the other end of the link as payload or signaling. The TBR transmit weights $\bar{g}$ are formed from the scaled conjugate of received weight vectors noting again the decoration denotes uplink. The transmit weights are scaled by the power control variable and sent to the transmit beamformer where the uplink data is processed before sending the weighted data streams to the antenna arrays.

The CBR then receives all uplink signals from L TBRs and computes receiver weight vectors $\overline{w}_j$ where j is the TBR link index. The uplink SINR $\overline{\gamma}_j$ is also computed for each of the links and will be sent to the TBRs on the downlink. Next, the transmit weights $\vec{g}_j$ are computed from the scaled conjugate of the receive weights $\overline{w}_j$ and applied to the downlink data.

Figure 8:
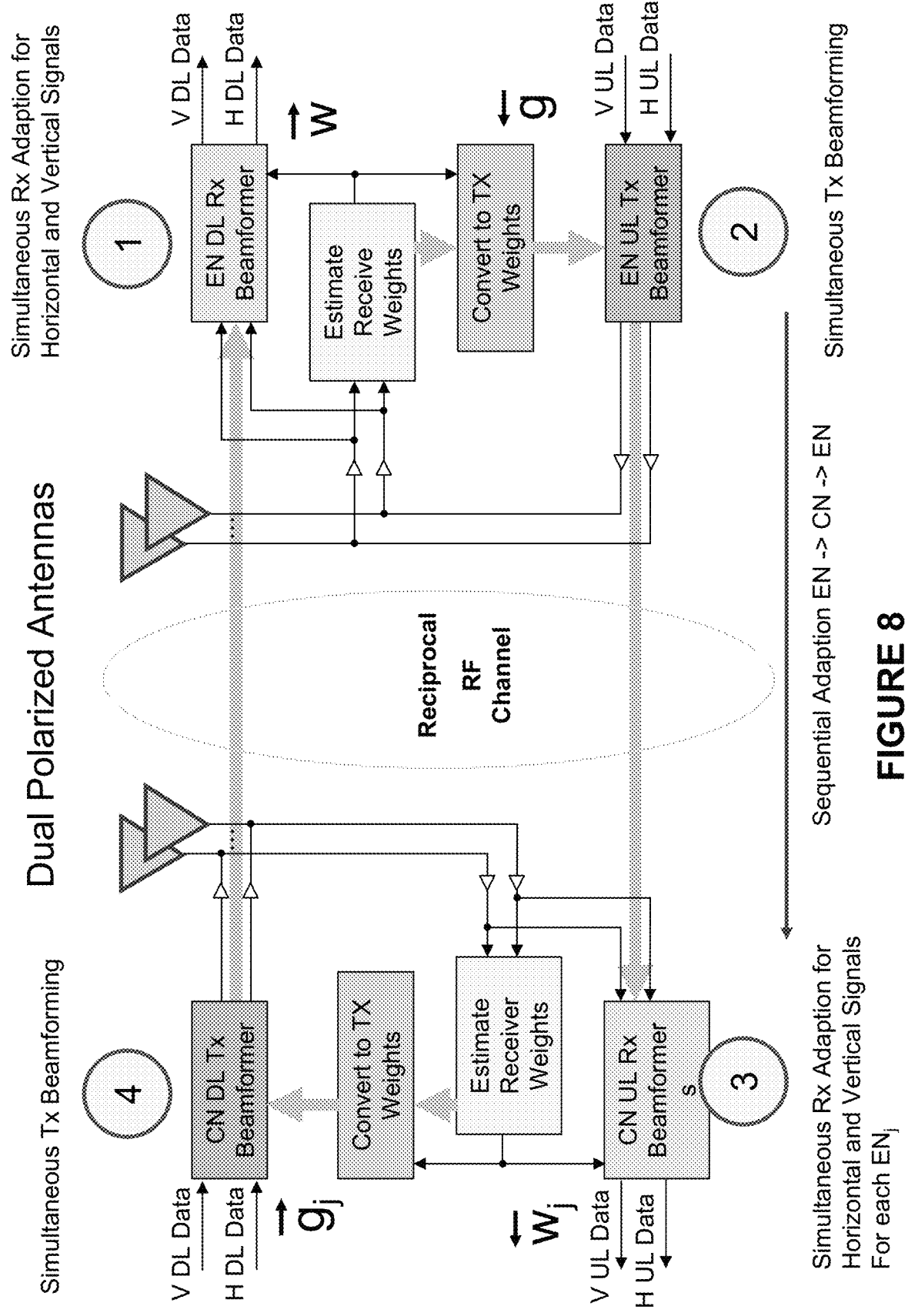
FIG. 8 illustrates an implementation of the communication protocol between the CBR and TBR of the system.

Note weight adaption ping-pongs in a sequential fashion between the CBR and TBR, improving the network's performance at each iteration as shown in FIG. 8. Since the CBR computes j simultaneous weights in the presence of the self interference of all TBRs, the method may be known as simultaneous/sequential weight adaptation. This approach will lead to an optimal solution across the network provided the transmitter powers are also adaptively controlled according to a power control criteria described earlier.

Channel Model

Figure 9:
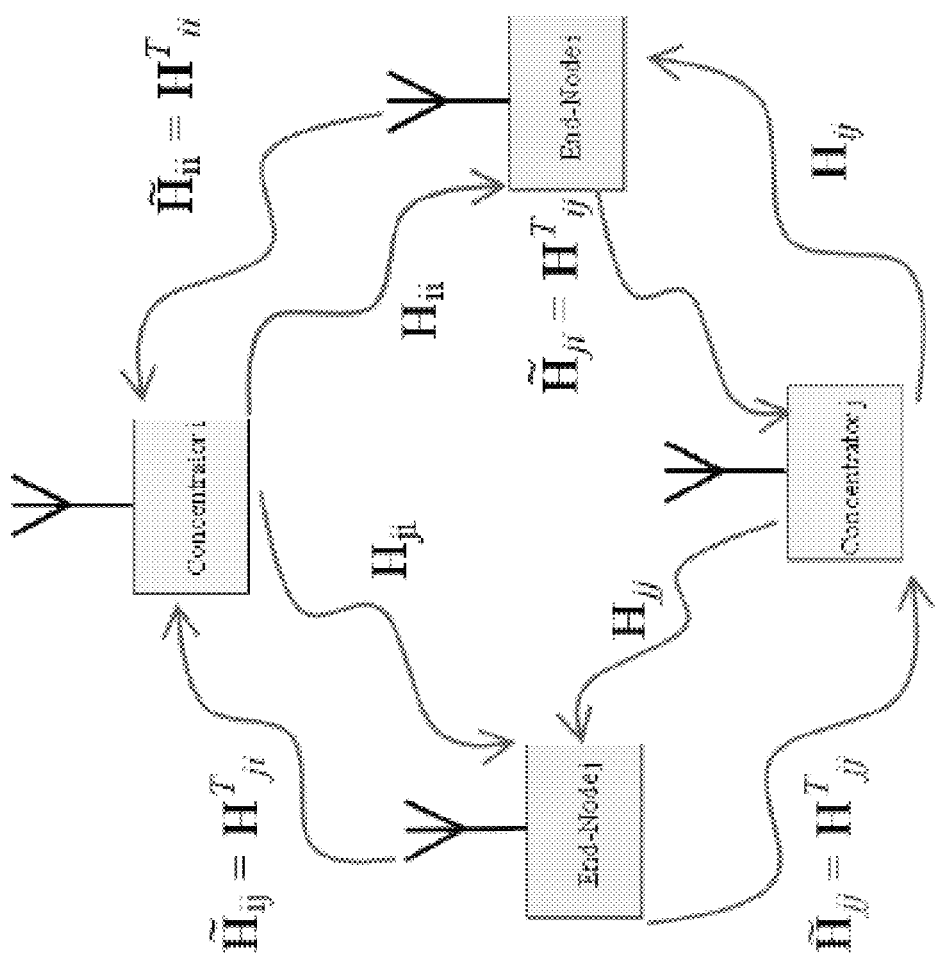
FIG. 9 illustrates a set of uplink and downlink RF channels on the system.

The channel model for the system and method can be decomposed into a narrowband representation where the received signal $y_i(n)$ is a result of receive beamforming using $N_1$ antennas and transmission beamforming using $N_2$ antennas and propagation through an RF channel matrix connecting transmit antennas to receiver antennas pair wise:

$$y_i(n) = w_i^H H_{ij} g_j \sqrt{p_j} d_j(n) + w_i^H \varepsilon_i(n)$$

where $w_i$ is the $N_1 \times 1$ weight vector at the end node for link i, $H_{ij}$ is the $N_1 \times N_2$ complex channel matrix for the CBR associated with link j to the end node associated with link i, $g_j$ is the $N_2 \times 1$ normalized downlink weight vector, $\sqrt{p_j}$ is the complex transmit voltage on the downlink j, $d_j(n)$ is the transmit signal for downlink j at time sample n and $\varepsilon_i(n)$ is a complex white Gaussian noise process seen at TBR i. The uplink and downlink RF channels are depicted in FIG. 9. The tilde decoration denotes uplink in FIG. 9. From FIG. 9, the following equation for the expected output signal-to-interference and noise ratio (SINR) seen be downlink i as, $$\gamma_i \equiv |w_i^H H_{ii} g_i|^2 p_i / \sum_{j \neq i} |w_i^H H_{ij} g_j|^2 p_j + \sigma_\varepsilon^2 w_i^H w_i$$

$$\gamma_i \equiv |w_i^H H_{ii} g_i|^2 p_i / \sum_{j \neq i} |w_i^H H_{ij} g_j|^2 p_j + \sigma_\varepsilon^2 w_i^H w_i \quad \text{(A1)}$$

$$\gamma_i \equiv T_{ii} p_i / \sum_{j \neq i} T_{ij} p_j + \sigma_\varepsilon^2 \gamma_i \equiv T_{ii} p_i / \sum_{j \neq i} T_{ij} p_j + \sigma_\varepsilon^2 \quad \text{(A2)}$$

$$T_{ij} \equiv \overline{w}_i^H H_{ij} \overline{w}_j^* p_i / \|\overline{w}_i\|^2 \|\overline{w}_j\|^2 \quad \text{(A3)}$$

$$T_{ij} \equiv \overline{w}_i^H H_{ij} \overline{w}_j^* p_i / \|\overline{w}_i\|^2 \|\overline{w}_j\|^2$$

$$g_j \equiv \overline{w}_j^* / \|\overline{w}_j\|^2 \quad \text{(A4)}$$

$$g_j \equiv \overline{w}_j^* / \|\overline{w}_j\|^2$$

$$p = [p_0, p_1 \cdots p_{N-1}]^T \quad \text{(A5)}$$

$$p = [p_0, p_1 \cdots p_{N-1}]^T$$

$$P = 1^T pP = 1^T p \quad \text{(A6)}$$

Optimal Power Control

If the channel between TBRs and CBRs is reciprocal or quasi-reciprocal within the time span of the adaptive loop, then it can be shown that the optimal transmitter weights are the scaled conjugate of the receiver weights. This is known as retro-directive beamforming. Moreover, if the transmit power is adaptively adjusted using an algorithm driven by the receive SINR and a target SINR $\overline{\gamma}_j$, then the network of CBRs and TBRs will converge to their target SINRs using minimum total network power P as described in the equations above. If the total network power can be minimized, then interference into adjacent cells is minimized thus enhancing the capacity of these cells and the overall network performance in general. The target SINR is determined by the bit error rate requirements of the communication link as determined by the modulation and coding scheme.

One simple method of power control computes the new power level from last power level and ratio of the target SINR to the received SINR. The equation can be expressed as:

$$p(l+1) = p(l) * \overline{\gamma}_j / \gamma_j p(l+1) = p(l) * \overline{\gamma}_j / \gamma_j \quad \text{(A7)}$$

where $\overline{\gamma}_j$ is the target SINR to close the link at acceptable BER and $\gamma$ is the SINR as defined above In this embodiment, the system has equalization gains (to be defined later) since the system needs the per-subcarrier equalization to be reflected in the power control on the transmit side of the equation. The effect is cumulative over all the nodes in the network. Note this algorithm estimates the SINR of link continuously. If it is too high with respect to the target SINR, then the next Tx power is reduced by ratio between the target and current SINR.

Each receiver will optimize its beamformer weights by maximizing the SINRs at both ends of the link. Normally we place no constraints on the weights. However it is possible to place structural constraints on the weights to simplify computations. If our optimization process increases the SINR and if our SINR targets remain constant; we will necessarily obtain a new solution that decreases all of the transmit powers and thus reducing P according to the equation above.

NLOS, STAP, SFAP, Polarization, Multiuser Processing, Equalization & Subbanding

Non Line-of-Sight Propagation Model

For the system and method, the model of the received data x(n) can be expressed as the sum of multipath signals arriving on p distinguishable paths each with steering vector $a_p$. The received data also includes spatial white Gaussian interference i(n) generated. Hence the model may be expressed as:

$$x(n) = Ad(n) + i(n)x(n) = Ad(n) + i(n) \quad \text{(B1)}$$

$$A = [a_1, a_2, \ldots a_p]A = [a_1, a_2, \ldots a_p] \quad \text{(B2)}$$

$$d(n) \equiv [\sqrt{\alpha_1} e^{-j\Theta_1} d(n-\tau_1), \sqrt{\alpha_2} e^{-j\Theta_1} d(n-\tau_2) \ldots \sqrt{\alpha_p} e^{-j\Theta_1} d(n-\tau_p)]^T$$

where $\sqrt{\alpha_p} e^{-j\Theta_p} \sqrt{\alpha_p} e^{-j\Theta_p}$ is the amplitude and phase of path p, $a_p$ is the steering vector for path p and $\tau_p$ is the time delay for path p. d(n) is the transmitted data and i(n) is the interference vector modeled as Gaussian white noise. The dimension of matrix A is N antenna sensors by P multipaths.

The Space-Time Adaptive Processor

An estimate $\hat{d}(n)$ of the original signal d(n) can be realized by processing the received data with a 2-dimensional filter in the dimensions of space and time, hence a space-time adaptive processor (STAP). This filter may be written as the linear convolution of receive vector x(n) at time n with the $K_1 + K_2 + 1 K_1 + K_2 + 1$ time taps of the filter where each time tap has coefficients $w^H(k) w^H(k)$ for $-K_1 \leq k \leq K_2$:

$$w^H(n) * x(n) = \hat{d}(n) w^H(n) * x(n) = \hat{d}(n) \quad \text{(C1)}$$

$$w^H(n) * x(n) \equiv \sum_{K=-K_1}^{K_2} w^H(k) x(n-k)$$

$$w^H(n) * x(n) \equiv \sum_{K=-K_1}^{K_2} w^H(k) x(n-k) \quad \text{(C2)}$$

$$w(n) \equiv [w_H(K_1), w^H(K_1-1), \ldots, w^H(-K_2)]^H$$

$$w(n) \equiv [w_H(K_1), w^H(K_1-1), \ldots, w^H(-K_2)]^H \quad \text{(C3)}$$

The error between the output of the STAP filter $\hat{d}(n)$ and the desired signal d(n) can be expressed as $\varepsilon(n) \varepsilon(n)$. We seek to minimize the expected value of the error power $\mu \mu$. where we replace the expectation with a time average over a suitably large interval over the time index n.

$$\varepsilon(n) = \hat{d}(n) - d(n) \varepsilon(n) = \hat{d}(n) - d(n) \quad \text{(C4)}$$

$$\mu = \langle |\varepsilon(n)|^2 \rangle_n \mu = \langle |\varepsilon(n)|^2 \rangle_n \quad \text{(C5)}$$

$$\varepsilon(n) \equiv \sum_{k=-K_1}^{K_2} w^H(k) x(n-k) - \hat{d}(n) \quad \text{(C6)}$$

$$\varepsilon^*(n) \equiv \sum_{k'=-K_1}^{K_2} x^H(n-k') w(k') - \hat{d}*(n) \quad \text{(C7)}$$

where the estimate of the signal and the signal conjugate is written as follows:

$$\hat{d}^*(n) \equiv \sum_{k'=-K_1}^{K_2} x^H(n-k') w(k') \quad \text{(C8)}$$

$$\hat{d}(n) \equiv \sum_{k=-K_1}^{K_2} w^H(k) x(n-k) \quad \text{(C9)}$$

The time averaged error power can be written as follows:

$$\mu = \left\{ \begin{array}{c} \sum_{k=-K_1}^{K_2} w^H(k)x(n-k) \sum_{k'=-K_1}^{K_2} x^H(n-k')w(k') - \\ \hat{d}^*(n) \sum_{k=-K_1}^{K_2} w^H(k)x(n-k) + \\ \hat{d}^2(n) - \hat{d}(n) \sum_{k'=-K_1}^{K_2} x^H(n-k')w(k') \end{array} \right\}_n \quad \text{(C10)}$$

Since the system would like to minimize the error power as a function of the tap weights to minimize the mean squared error, the partial differentials with respect to the tap weights can be taken as follows:

$$\frac{\delta\mu}{\delta w^H(j)} = \sum_{k=-K_1}^{K_2} w^H(k) \sum_{k'=-K_1}^{K_2} x(n-k)x^H(n-k')(w(k') \quad \text{(C11)}$$

$$= 2 \sum_{k'=-K_1}^{K_2} R_{xx}(-k, k')w(k')$$

for $j = k$, otherwise 0 for $j = k$, otherwise 0

$$\frac{\delta\mu}{\delta w^H(j)} = \hat{d}^*(n) \sum_{k=-K_1}^{K_2} w^H(k)x(n-k) \quad \text{(C12)}$$

$$= 2\hat{d}^*(n) \sum_{k=-K_1}^{K_2} x(n-k)$$

for $j = k$, otherwise 0 for $j = k$, otherwise 0

$$\frac{\delta\mu}{\delta w^H(j)} = \hat{d}(n) \sum_{k=-K_1}^{K_2} x^H(n-k')w(k') = 0 \quad \text{(C13)}$$

$$\frac{\delta\mu}{\delta w^H(j)} = \hat{d}^2(n) = 0 \quad \text{(C14)}$$

Hence, the equations can be rewritten as follows:

$$\frac{\delta\mu}{\delta w^H(j)} = 2 \sum_{k'=-K_1}^{K_2} R_{xx}(k', -k)w(k') - 2r_{xd}(-k) \quad \text{(C15)}$$

where the following expressions are defined:

$$r_{xd}(-k) \equiv \langle (n-k)d^*(n) \rangle_n r_{xd}(-k) \equiv \langle x(n-k)d^*(n) \rangle_n \quad \text{(C16)}$$

$$R_{xx}(k'-k) \equiv R_{xx}(k'-k) \equiv \langle x(n-k)x^H(n-k') \rangle_n$$

$$R_{xx}(k'-k) \equiv R_{xx}(k'-k) \equiv \langle x(n-k)x^H(n-k') \rangle_n \quad \text{(C17)}$$

Setting the partial derivatives to zero for each weight vector, the essential equations can be rewritten as:

$$\sum_{k'=-K_1}^{K_2} R_{xx}(k', -k)w(k') = r_{xd}(-k) \quad \text{(C18)}$$

for $-K_1 \leq k \leq K_2, -K_1 \leq k \leq K_2$. The above equation can be rewritten in matrix form as:

$$R_{XX}W = R_{xd} R_{XX}W = R_{xd} \quad \text{(C19)}$$

Where $$W \equiv [w^H(-K_1), w^H(-K_1+1), \cdots, w^H(K_2)]^H \quad \text{(C20)}$$

$$W \equiv [w^H(-K_1), w^H(-K_1+1), \cdots, w^H(K_2)]^H$$

$$R_{xd}(n) \equiv [r_{xd}^H(K_1), r_{xd}^H(K_1-1), \cdots, r_{xd}^H(-K_2)]^H \quad \text{(C21)}$$

$$R_{xd}(n) \equiv [r_{xd}^H(K_1), r_{xd}^H(K_1-1), \cdots, r_{xd}^H(-K_2)]^H$$

$$R_{xx} = \begin{bmatrix} R_{xx}(0) & \cdots & R_{xx}(-K_1-K_2) \\ \vdots & \ddots & \vdots \\ R_{xx}(K_1+K_2) & \cdots & R_{xx}(0) \end{bmatrix} \quad \text{(C22)}$$

$$R_{xx} = \begin{bmatrix} R_{xx}(0) & \cdots & R_{xx}(-K_1-K_2) \\ \vdots & \ddots & \vdots \\ R_{xx}(K_1+K_2) & \cdots & R_{xx}(0) \end{bmatrix}$$

Rewriting in summation form $$\sum_{k=-K_1}^{K_2} R_{xx}(k'+k)W(k') = R_{xd}(k) \quad \text{(C23)}$$

Fast Transform Methods for Solving the STAP Problem

The above equations are formulated as a correlation. Thus, a linear transform via the well known Discrete Fourier Transform (DFT) to further simplify the computations are further simplified by replacing the correlation with multiplications in the transformed domain using a fast convolution/correlation theorem efficiently implemented via the well know Discrete Fourier Transform (DFT). First, the DFT F is defined as the K×K matrix transformation as follows:

$$F \equiv [\omega^{mk}] F \equiv [\omega^{mk}] \quad \text{(D1)}$$

For $0 \leq m, k \leq K-1 0 \leq m, k \leq K-1$ and $\omega = e^{-j2\pi/K} \omega = e^{-j2\pi/K}$ Note the property of the inverse DFT is as follows:

$$F^{-1} = F^H F^{-1} = F^H \quad \text{(D2)}$$

Given this definition, the correlation expression above in the transformed domain can be rewritten as follows:

$$F \sum_{k'=-K_1}^{K_2} R_{xx}(k, k')W(k') = FR_{xd}(k) \quad \text{(D3)}$$

$$\sum_{k=0}^{K-1} \sum_{k'=-K_1}^{K_2} R_{xx}(k+k')W(k')\omega^{mk} = \sum_{k=0}^{K-1} R_{xd}(k)\omega^{mk} \quad \text{(D4)}$$

For $0 \leq m, k \leq K-1 0 \leq m, k \leq K-1$ and $\omega = e^{-j2\pi/K} \omega = e^{-j2\pi/K}$ where $K \geq K_1 + K_2 + 1$. $K \geq K_1 + K_2 \circ 1$. Let $k + k'k + k' = q$ and $k = q - k'k = q - k'$ $$\sum_{q=0}^{K-1} \sum_{k'=-K_1}^{K_2} R_{xx}(q)\omega^{mq} W(k')\omega^{mk'} = \sum_{k=0}^{K-1} R_{xd}(k)\omega^{mk} \quad \text{(D5)}$$

$$\sum_{q=0}^{K-1} R_{xx}(q)\omega^{mq} \sum_{k'=-K_1}^{K_2} W(k')\omega^{-mk'} = \sum_{k=0}^{K-1} R_{xd}(k)\omega^{mk} \quad \text{(D6)}$$

$$\overline{R}_{xx}(-m)\overline{W}(m) = \overline{R}_{xd}(-m) \overline{R}_{xx}(-m)\overline{W}(m) = \overline{R}_{xd}(-m) \quad \text{(D7)}$$

Where the over bar indicates the Discrete Fourier Transform as follows $$\overline{W}(m) = \sum_{k'=-K_1}^{K_2} W(k')\omega^{-mk'} \quad (D8)$$

$$\overline{R}_{xd}(-m) = \sum_{k=0}^{K-1} R_{xd}(k)\omega^{mk} \quad (D9)$$

$$\overline{R}_{xx}(-m) = \sum_{q=0}^{K-1} R_{xx}(q)\omega^{mq} \quad (D10)$$

Finally, we can express the space-time filter solution as $$W(k') = F^{-1}\overline{W}(m) = F^{-1}\overline{R}_{xx}^{-1}(-m)\overline{R}_{xd}(-m)$$

$$W(k') = F^{-1}\overline{W}(m) = F^{-1}\overline{R}_{xx}^{-1}(-m)\overline{R}_{xd}(-m) \quad (D11)$$

For each of taps on the space-time filter $-K_1 \leq k' \leq K_2$, $-K_1 \leq k' \leq K_2$.

Improving Computational Efficiency

Note that for efficiency, an FFT and IFFT can be used to replace the DFT in the above equations. In this case, replace $3K^2 3K^2$ complex multiply/accumulates to realize the matrix multiplications associated with the DFTs and IDFT with $3 \log_2 K \log_2 K$ complex multiply/accumulates using the fast Fourier transform method. This results in one to two orders of magnitude savings depending on the length of the filter in the time domain.

Furthermore, note that the weight solution for the space-time filter requires the formation of K covariance matrices of dimension N×N and K cross-correlation vectors of length N. This is a considerable reduction in computation complexity compared to the original problem.

Improving Numerical Accuracy

Now express $\overline{R}_{xx}(-m)\overline{R}_{xx}(-m)$ in terms of its QR decomposition of the underlying data X $$\overline{R}_{xx}(-m) = \overline{X}^H \overline{X} \overline{R}_{xx}(-m) = \overline{X}^H \overline{X} \quad (D12)$$

$$\overline{X} = \overline{QR}_x \overline{X} = \overline{QR}_x \quad (D13)$$

Where $\overline{R}_x \overline{R}_x$ is the Cholesky factor of the covariance matrix $\overline{R}_{xx}\overline{R}_{xx}$. The Cholesky factor is an upper triangular matrix and where $\overline{QQ}$ is a orthonormal matrix $$\overline{R}_{xx}(-m,m') = \overline{R}_x^H \overline{Q}^H \overline{QR}_x \overline{R}_{xx}(-mm') = \overline{R}_x^H \overline{Q}^H \overline{QR}_x \quad (D14)$$

$$\overline{Q}^H \overline{Q} = I \overline{Q}^H \overline{Q} = I \quad (D15)$$

And finally, substituting the Cholesky factor for the covariance matrix leads to the following expression. Note that the equation may be solved for $\overline{WW}$ efficiently using two back substitutions.

$$\overline{R}_x^H(-m,m')\overline{R}_x(-m,m')\overline{W}(m') = \overline{R}_{xd}(-m)$$

$$\overline{R}_x^H(-m,m')\overline{R}_x(-m,m')\overline{W}(m') = \overline{R}_{xd}(-m) \quad (D16)$$

Space Frequency Adaptive Processing

The 2-dimensional STAP beamformer may be realized in the frequency domain by exploiting the Fourier Transform of the baseband signals from the array. In this case, the signal is "channelized" by the transform into multiple frequency subbands such that the array response is constant or nearly constant across the subchannel. The implication is that the subchannel frequency support should be a fraction of the inverse of the RMS delay dispersion of the signal's multi-path components. Hence, narrowband beamforming may be performed on each subchannel. This is known as Space Frequency Adaptive Processing (SFAP).

Note that the number of subchannels is approximately equal to the number of STAP taps in the delayline. SFAP may be the preferred embodiment for many signal types including OFDM, OFDMA and SC-FDMA. These signals are naturally constructed in the frequency domain using data subchannels, pilots for demodulation and preambles as can be observed by examining the specifications for LTE and 802.16. The formation the SFAP equations begin with a model of the beamforming symbols:

$$Xw = d + e \quad (E1)$$

where X is the received signal matrix of M rows of time samples by N antennas, w is the CBR receive beamforming weight vector of length K, d is the desired symbol vector of length M and e is the error in this model due to noise plus interference. Pre-multiply (D1) by $X^H$ to get:

$$X^H Xw = X^H d + X^H e X^H Xw = X^H d + X^H e \quad (E2)$$

The minimum mean squared error solution is obtained by choosing the weight vector so that the received signal matrix is orthogonal to the error vector:

$$X^H e X^H e = 0 \quad (E3)$$

Equation (E2) can be written as:

$$R_{xx} w = R_{xd} R_{xx} w = R_{xd} \quad (E4)$$

where the auto-correlation matrix and the cross-correlation vector are respectively:

$$R_{xx} = X^H X R_{xx} = X^H X \quad (E5)$$

$$R_{xd} = X^H d R_{xd} = X^H d \quad (E6)$$

Solving (E4) for the weight vector yields:

$$w = R_{xx}^{-1} R_{xd} w = R_{xx}^{-1} R_{xd} \quad (E7)$$

Substituting (E7) into (E1) and solving for the error vector yields (E8) and the error power per symbol is as follows and expanding (E9) by (E8) yields (E10):

$$e = X(X^H X)^{-1} X^H d - d e = X(X^H X)^{-1} X^H d - d \quad (E8)$$

$$\sigma_e^2 = e^H e / N \sigma_e^2 = e^H e / N \quad (E9)$$

$$N \sigma_e^2 d^H d - d^H X (X^H X)^{-1} X^H d$$

$$N \sigma_e^2 d^H d - d^H X (X^H X)^{-1} X^H d \quad (E10)$$

Comparing (E10) and (E7), the error power can be expressed as a function of the weight vector:

$$N \sigma_e^2 d^H d - Re(R_{xd}^H w) N \sigma_e^2 = d^H d - Re(R_{xd}^H w) \quad (E11)$$

The QR decomposition of X is:

$$X = QR_x X = QR_x \quad (E11a)$$

where Q is an orthonormal matrix the same size as X (M rows of subcarriers by N antennas):

$$Q^H Q = I Q^H Q = I \quad (E11b)$$

and $R_x R_x$ the Cholesky factor matrix of the auto-correlation matrix and is a N by N upper-triangular matrix. Substituting (E11a) into (E5), we obtain:

$$R_{xx} R_x^H Q^H Q R_x R_{xx} = R_x^H Q^H Q R_x \quad (E11c)$$

But because Q is orthonormal (D11b), the auto-correlation matrix is simply the product of two Cholesky factors:

$$R_{xx} = R_x^H R_x R_{xx} = R_x^H R_x \quad (E12)$$

We then substitute the Cholesky factors of (E12) into the error power of (D10):

$$N\sigma_e^2 d^H d - R_{xd}^H (R_x^H R_x)^{-1} R_{xd}$$

$$N\sigma_e^2 d^H d - R_{xd}^H (R_x^H R_x)^{-1} R_{xd} \quad \text{(E13)}$$

which can be written as:

$$N\sigma_e^2 = d^H d - u^H u N\sigma_e^2 = d^H d - u^H u \quad \text{(E14)}$$

where the biased estimate of the desired symbol vector is:

$$u = R_x^{-H} R_{xd} u = R_x^{-H} R_{xd} \quad \text{(E15)}$$

Note that u is the solution to the equation:

$$R_x^H u = R_{xd} R_x^H u = R_{xd} \quad \text{(E15a)}$$

which can be solved by back substitution of the upper triangular matrix $R_x^H R_x^H$ into $R_{xd} R_{xd}$. Substituting (E12) into (A7) yields the weight vector:

$$w = R_x^{-1} R_x^{-H} R_{xd} w = R_x^{-1} R_x^{-H} R_{xd} \quad \text{(E15b)}$$

which can also be written as:

$$R_x w = R_x^{-H} R_{xd} R_x w = R_x^{-H} R_{xd} \quad \text{(E15c)}$$

By substituting (E15) into (E15c), we obtain:

$$R_x w = u R_x w = u \quad \text{(E15d)}$$

which can be solved for ww by back substitution of the upper triangular matrix $R_x R_x$ into uu.

Equalization and Subbanding

The formulation of the (A1) through (A15) assumes that the matrix X contains M subcarriers in the estimation of the first and second order statistics. For each subcarrier, this may be satisfied by collecting M subcarriers over the time interval of $JT_s$ where $T_s$ is the symbol time of the OFDM(A) baseband. J is selected to satisfy certain constraints dictated by the mis-adjustment of the linear combiner with respect to the desired signal. A nominal figure of merit for M is 4 times the degrees of freedom (4×DOF) for a mis-adjustment loss of <1 dB.

Alternately, the time-bandwidth product constraint maybe satisfied by forming the first and second or statistics over $M_{sc} \times M_{sym} = M$ subcarriers where $M_{sym}$ is the number of subcarrier per subband and $N_{sym}$ is the number of symbols required to satisfy the M subcarrier time-bandwidth product (TBP) constraint.

This formulation is valid provided that the phase and amplitude of the steering vector is relatively constant over the subband of $M_{sc}$ subcarriers. In fact, this method is advantageous in lowering the number of training symbols to meet the TBR required for link adaption.

In the system, we note that while maximizing $M_{sc}$ subcarriers subject to the SINR constraints is advantageous, it ultimately fails as the received SINR declines as $M_{sc}$ subcarriers gets too large subject to the dispersion of the multipath. However, the method may add a final processing step to improve performance for a constrained number of subcarriers and model the collection of data over the subband as a constant steering vector perturbed by small variation in phase and amplitude. Often, this is a low order model in both amplitude and phase. Hence, is a small phase and amplitude ramp across the subband can be estimated accurately by pilot subcarriers present/insert in the baseband of the signal (e.g. Wimax and LTE).

So the final processing in the frequency domain is to collect the first and second order statistics and to estimate the post beamforming phase and amplitude tilt across the subband for receiver processing. Then upon transmit, conjugate the phase and apply the amplitude corrections while applying them to the transmitter weight derived from the receiver weight vector. Note that the phase and amplitude tilt is unique for each subcarrier within in the subband. Thus each subcarrier has a unique linear combiner Rx weight and Tx weight conjugate.

This process is defined as subband equalization and yield superior network performance. It is an additional component in achieving EIC.

Equalization and Power Control

For SFAP, it may not be intuitively obvious how transmit equalization helps, there is still a relatively simple mathematical reason why it improves performance. If the method looks at the sum total transmit power on the uplink or on the downlink, reciprocity says that these two quantities are equal and are used as a network wide performance metric which may be known as quantity P. On the downlink this as a function of all the receiver weights at the TBRs called W, and as a function of all the transmit weights at the concentrators G. Thus P(W,G) becomes the network performance metric to be optimized. Technically this metric is a function of the weights on each subcarrier. Optimizing the receiver weights at the TBRs yields, $\min_W P(W,G)$. Equalization, in this context, optimizes components of W. At the TBRs, if the system does not transmit with the conjugate of the equalization gains, then the method is refusing to optimize over all the components of G. In terms of the degrees of freedom associated with just the equalization components, that's half the degrees of freedom in the network and this performance suffers. Better performance is achieved optimizing both transmit and receive weights according to $\min_W \min_G P(W, G)$.

Reciprocity proves that the optimal G are the conjugate of the concentrator receiver weights and thus are included the equalization gains as well. The effect is cumulative over all the nodes in the network. The fact that P(W,G) is reciprocal means that optimizing over equalization gains and transmitting with them necessarily improves all nodes in the network.

In this system and method, it is more intuitive to think in terms of what equalization does to the weights qualitatively. If a minimum complexity rank 1 beam is all that is required in the direction of the intended node, more degrees of freedom are then devoted to interference cancellation. Thus equalization will improve the channel in the direction of the intended node and that's all it has to do to improve overall network performance.

Capacity Matching, MCS Downshifting

In this system and method, the real-time capacity requirements of equipment attached (i.e. a base station) to and from the TBR can be sensed and the modulation and coding scheme (MCS) can be adaptively adjusted to meet these requirement. This is known as MCS downshifting and upshifting. In the downshifting scheme, a moving average of the uplink and downlink capacity is computed by subtracting the "filler" symbols from the total symbols in order to estimate the number of "traffic" symbols. Next, a new and lower MCS level is computed that would essentially pack all symbols and remove the filler. Headroom is added to this computation so as not to remove all filler. This is now the safe MCS level and the downshift can be commanded to the new level via PHY signaling (e.g. MAP). In the upshifting scheme, the data queues for the uplink and downlink are monitored. If these are not emptied on each transmission interval, a higher MCS is warranted and the safe MCS level can be computed from a queue statistics. The upshift can be commanded to the new level via PHY signaling (e.g. MAP). Since the SINR requirements are lower for a MCS downshift, the TX power of the link can be lowered reducing interference power. Thus, downshifting increases the overall capacity of the network by allowing additional links (>L) or higher MCS levels for other links.

Best Serving CBR, Network Resiliency and Handover

In this system and method, the TBRs may establish connections to multiple CBRs for the purpose of selecting the best serving CBR. The best serving CBR may be sensed by computing the SINR of each link, estimating the quality of the multipath channel, determining the loading of the CBR, estimating the potential SINR degradation to other links currently connected to the CBR, or any combinations of these metrics. The TBR will then request connection to the best serving CBR and generate a neighbor list of other CBRs. The list will include the required timing parameters and power levels to each CBR. Using the neighbor list, a TBR can quickly switch over to another CBR if either the CBR fails or the propagation channel becomes impaired. This provides a level of network resiliency and reliability.

Subbanding and Subzoning

In this system and method, the full capacity Q bps of each link can be subdivided into $L_{sb}$ sublinks with each with capacity $Q/L_{sb}$. This maybe realized by using $L_{sb}$ subbands in the frequency domain. Alternately, a frame of data symbols may be divided into $L_{sb}$ subzones in the time domain. Note, that various linear combinations of capacity may be realized by aggregating integer numbers of subbands and/or subzones. A combination of subbanding and subzoning is also supported.

Dual Polarization, Optimal Polarization Separation

Figure 10:
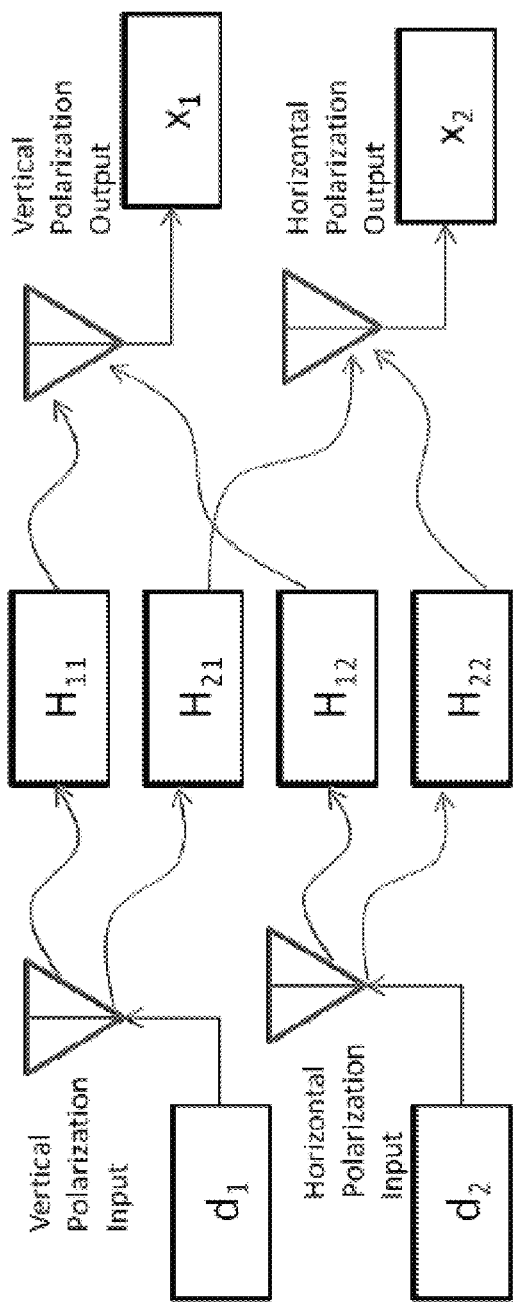
FIG. 10 illustrates the RD channels.

For this system, the system may transmit with two independent data streams $d_1(n)$ and $d_2(n)d_1(n)$ and $d_2(n)$ on two different polarization with transmit weight $g_1$ and $g_2 g_1$ and $g_2$ respectively. This effectively doubles the data rate. Unfortunately, there is cross-coupling between the polarizations due to propagation through an RF channel that mixes the polarization as shown in FIG. 10.

The receiver sees a mixture of the desired data $d_1(n)d_1(n)$ via the principle channel matrix $H_{11}H_{11}$ and an interference term $d_2(n)d_2(n)$ via the cross coupling matrix of the other polarization $H_{12}H_{12}$ according the first equation below. In a similar fashion, the receiver for the orthogonal polarization sees a mixture the desired data $d_2(n)d_2(n)$ via the principle channel matrix $H_{22}H_{22}$ and an interference term $d_1(n)d_1(n)$ via the cross coupling term of the other polarization $H_{21}H_{21}$ according the second equation below.

$$x_1(n)=H_{11}g_1\sqrt{p_1}d_1(n)+H_{12}g_2\sqrt{p_2}d_2(n)+i_2(n)$$

$$x_1(n)=H_{11}g_1\sqrt{p_1}d_1(n)+H_{12}g_2\sqrt{p_2}d_2(n)+i_2(n) \quad \text{(F1a)}$$

$$x_2(n)=H_{21}g_1\sqrt{p_1}d_1(n)+H_{22}g_2\sqrt{p_2}d_2(n)+i_2(n)$$

$$x_2(n)=H_{21}g_1\sqrt{p_1}d_1(n)+H_{22}g_2\sqrt{p_2}d_2(n)+i_2(n) \quad \text{(F1b)}$$

The first equation maybe recast as the desired signal being received on aperture $a_{11}(n)a_{11}(n)$ in the presence of cross-coupled interference on aperture $a_{12}(n)a_{12}(n)$ and generalized interference aperture $i_1(n)i_1(n)$ where the apertures are defined here. The same is true for the second equation.

$$a_{11}(n)=H_{11}g_1 a_{11}(n)=H_{11}g_1 \quad \text{(F2a)}$$

$$a_{12}(n)=H_{12}g_2 a_{12}(n)=H_{12}g_2 \quad \text{(F2b)}$$

Given this formulation, the optimal weights for the down link (CBR to TBR) can be computed by forming the $2N_1 \times 1$ receiver data vector and computing the relevant first and second order statistics below. This is the optimal MMSE solution for narrowband signals.

$$x(n) = \begin{bmatrix} x_1(n) \\ x_2(n) \end{bmatrix} x(n) = \begin{bmatrix} x_1(n) \\ x_2(n) \end{bmatrix} \quad \text{(F3a)}$$

$$\vec{w}_1 = R_{xx}^{-1} R_{xd_2} \vec{w}_1 = R_{xx}^{-1} R_{xd_1} \quad \text{(F4a)}$$

$$\vec{w}_2 = R_{xx}^{-1} R_{xd_2} \vec{w}_2 = R_{xx}^{-1} R_{xd_2} \quad \text{(F4b)}$$

The equations above maybe extended in a straightforward fashion for wideband data receive in multipath using the STAP and SFAP solutions previously above.

For the uplink (TBR to CBR), the weight solutions can be computed as above with $2N_2$ degrees of freedom, or with substantially lower complexity via the equations below. In this case, this invention computes weights using $x_1(n)x_1(n)$ and $x_2(n)x_2(n)$ instead of $x(n)x(n)$. We note that the polarization wavefronts arrive without cross-coupling since the TBR transmit weights were derived from the conjugate of the downlink TBR receive weights which are known to removed the cross-coupling components.

$$\overline{w}_1 = R_{x_1 x_1}^{-1} R_{x_1 d_1} \overline{w}_1 = R_{x_1 x_1}^{-1} R_{x_1 d_1} \quad \text{(F5a)}$$

$$\overline{w}_2 = R_{x_2 x_2}^{-1} R_{x_2 d_2} \overline{w}_2 = R_{x_2 x_2}^{-1} R_{x_2 d_2} \quad \text{(F5b)}$$

Note, any orthogonally polarized antennas sets may be substituted with the same result such as vertical and horizontal, slant left and right, or RHCP and LHCP.

The Reference Symbols and Data Directed Feedback

The reference signals for link adaption may be realized from special training symbols, embedded pilots (e.g OFDM pilots for data demodulation), preambles, statistical significant data replications, baseband signal replications (e.g. cyclic prefix) in either the time or frequency domain, the signal's known constellation (known modulus), or by data directed feedback techniques using payload data or by combinations of above.

In one embodiment of this system and method, it can be illustrated how the reference signals may be utilized. In this scheme, the CBR sends the desired vertical and horizontal reference signals $d_v(k)$ and $d_h(k)$ on the vertical and horizontal array respectively simultaneously. The reference signals are generated by modulating OFMDA subcarriers in the frequency domain using elements of codes derived from CAZAC sequences. Alternately, the reference signals can be the modulation on the data symbols of a single carrier in the time domain. CAZAC codes are a set of orthogonal codes with constant amplitude and zero circular auto-correlation and low circular cross-correlation. Hence $d_v(k)$ and $d_h(k)$ have low or zero cross-correlation. The CAZAC codes can be expressed as $$d(k) = e^{-j2\pi \frac{r}{L}[k^2/2 + qk]} \text{ for } k = 0, 1, \ldots L-1 \text{ and}$$

$r$ relatively prime to $L$, $q$

CAZAC codes from the same family are assigned to each TBR within the footprint of the CBR. Each TBR is assigned two CAZAC codes, one for each polarization. Because each code has low cross-correlation with the others, high quality estimates of cross correlation vectors are formed. This is important to minimize array mis-adjustment of the linear combiner due to noise weight vectors computed from the normal equations.

$$w = R_{xx}^{-1} R_{xd} w = R_{xx}^{-1} R_{xd} \quad \text{(F6)}$$

For the SFAP embodiment, $R_{xx}^{-1}R_{xx}^{-1}$ and $R_{xd}R_{xd}$ are estimated over a block of P*L/B subcarriers containing the reference signals where P is the number of OFMDA symbols modulated by the reference signal and B is the number of subbands. A subband is defined as a group of K/B adjacent subcarriers where the relative differences between steering vectors measured on each member subcarrier as small. Thus, the linear combiner weights for the receiver are updated for each block of reference signal subcarriers. The SINR of the received signal maybe also estimated over this block. The SINR is useful for transmission power control when relayed to the other end of the link.

Reference Symbols Derived from Data Directed Feedback

Often the 2D-BFN weight accuracy derived from above can be enhanced by computing the first and second order statistics over a longer time interval not limited to the reference symbols. In this case, the data payload part of the frame may be used. One embodiment correlates a delayed copy of the received data at multiple tap delays with an estimate of the data re-modulated using the same modulation and coding scheme (MCS) of the link. The data covariance is computed over this same time interval. This technique is known as STAP/SFAP data directed feedback (DDF) from and is illustrated in the figure above.

By using DDF, the embodiment achieves higher efficiency and link capacity since fewer reference symbols are required for link convergence when supplemented with a payload-derived "reference symbols" extracted from the payload. Moreover, DDF may extract reference symbols from the entire receive interval. This enables robust interference cancellation of unmanaged interference occurring in the data payload part of the subframe and but not available in the reference symbol part of the subframe. In this case, this is the preference embodiment for unlicensed frequency bands or licensed bands with unmanaged interference.

Multiuser STAP

In the system, the CBR performs a link "concentration" function by simultaneously connecting to L TBRs using L (single polarization) or 2L (dual polarization) sets of STAP weights. The governing L equations are given below:

$$\sum_{k=-K_1}^{K_2} R_{xx}(k'+k)W_1(k') = R_{xd_1(k)} \quad (G1)$$

where the equation is the index over L links connected to the CBR and is the index over L links connected to the CBR and $1 \leq l \leq L 1 \leq l \leq L$. Note for best performance, $d_l d_l$ should have low or zero cross-correlation among all $d_i d_j$ where $j \neq l j \neq l$.

Multiuser SFAP

In the system, the CBR concentration function for L simultaneous links to L TBRs may realized in the frequency domain yields the multiuser SFAP solution. The governing L (or 2L for dual polarization) equations are given below:

$$u_l = R_x^{-1} R_{xd_j} u_l = R_x^{-1} R_{xd_j} \quad (G2)$$

$$R_x w_l = u_l R_x w_l = u_l \quad (G3)$$

where $u_1$ is the index over L links connected to the CBR and in the index over L links connected to the CBR and $1 \leq l \leq L 1 \leq l \leq L$. Note for best performance, $d_l d_l$ should have low or zero cross-correlation among all $d_i d_j$ where $j \neq l j \neq l$.

Dynamic Multiuser Power Allocation

The CBR antenna power delivered by each power amplifier (PA) is the sum of all powers for L links as weighted by the complex element $g_m$ of the transmit weight vector g where m is the antenna/PA index.

The power P of all links in given below $$p = [p_0, p_1, \ldots, p_{L-1}]^T p = [p_0, p_1, \ldots, p_{L-1}]^T \quad (H1)$$

$$P = 1^T p P = 1^T p \quad (H2)$$

Power must be allocated to each link to maintain the target SINR and the total power to each PA cannot exceed the $P_{PA}$. One technique is to allocate equal maximum power $P_{PA}/L$ for each link. This is a very conservative method and suboptimal since some links require more power and some require less due to distance variation from the CBR. This method causes the power required at the PA to be over specified.

In the system, the power can be allocated differently according to the following equations:

$$p \to p_{max} p \to p_{max} \quad (H3)$$

$$p_{pa} = Gp_{max} P_{pa} = Gp_{max} \quad (H4)$$

$$f[p_{maxpa}, p_{pa}] \to p_{max} f[p_{maxpa}, p_{pa}] \to p_{max} \quad (H5)$$

where the columns of G contain the power in each element of the transmit weight vectors for the L links. In this implementation, p is the initial estimate of the link powers derived from initial ranging. The power $p_{pa}$ to each PA can then be evaluated using the power scaling factors from each of L transmit weights contained in G post multiplied by the initial estimate of $p_{max}$. Based on the computed PA power, and a vector of maximum permissible powers $p_{max\,pa}$, a new $p_{max}$ can be computed by a variety of functions, methods and/or iterations. If there is a reasonable spread between power requirements of the links due to "near-far" distance variation, then this method yields significantly better performance.

This system may thus be called dynamic multiuser power allocation and can improve the power available to TBRs at the edge of coverage by 2-6 dB depending on L, $N_1$, $N_2$ and spatial distribution of the end points.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A wireless communication system, comprising:
a communication link having a first end and a second end that communicate over reciprocal radio frequency channels, the communication link having at least two radios at each end of the communication link, each radio having a transmit beamformer bank and a receive beamformer bank; and
at least one transmit beamformer bank at each end of the communication link and at least one receive beamformer bank at each end of the communication link exchanging data with each other to transmit data over the communication link;
wherein each beamformer bank is a set of beamformers and each beamformer is configured to process a section of a frequency band of the communication link wherein each section is a subband of the frequency band and two or more subbands span the frequency band, wherein at least one transmit beamformer of the transmit beamformer bank is configured to use one or more transmit beamforming weights to perform transmit beamforming, wherein at least one receive beamformer of the receive beamformer bank is configured to use one or more receive beamforming weights to perform receive beamforming, wherein at least one weight of the one or more transmit beamforming weights and the one or more receive beamforming weights is a complex weight comprising a phase and an amplitude, the at least one weight being specific to a subcarrier, and wherein the at least one transmit beamforming weight is determined based on a scaled complex conjugate of a respective receive beamforming weight.

2. The system of claim 1, wherein the communication link has the first end and the second end and wherein at least one transmit beamformer bank at the first end of the communication link generates a beam pattern and at least one receive beamformer bank at the second end of the communication link receives the beam pattern to optimize the transmission of data over the communication link.

3. The system of claim 2, wherein the at least one transmit beamformer bank at the second end of the communication link transmits a beam pattern, based on the one or more receive beamforming weights, to the at least one receive beamformer bank at the first end of the communication link.

4. The system of claim 3, wherein the at least one transmit beamformer bank at the first end of the communication link generates a beam pattern, based on the one or more receive beamforming weights, to the at least one receive beamformer bank at the second end of the communication link.

5. The system of claim 4, wherein the transmit and receive beamformer banks optimize the communication link in the presence of same frequency interference from other sectors where two or more concentrating nodes are co-located together where a sector represents the radio coverage of a field of view.

6. The system of claim 4, wherein the transmit and receive beamformer banks optimize the communication link in the presence of same frequency interference from other concentrating radio sites where two or more concentrating radios sites are in a same geographical area where they are close enough to cause intercell interference.

7. The system of claim 4, wherein the transmit and receive beamformer banks optimize the communication link and in combination with a power control algorithm converges a theoretical optimal capacity while minimizing an overall transmit power.

8. The system of claim 4 further comprising a power control process associated with radios and wherein the transmit and receive beamformer banks and the power control process maximizes a capacity of the communication link while using only local pilots/reference signals available at the local receivers.

9. The system of claim 1, wherein the communication link has a first end and a second end and wherein the radio at the first end of the communication link is a concentrating node and the radio at the second end of the communication link is an end node.

10. The system of claim 9, wherein the transmit beamformer bank of the concentration radio generates a downlink data signal and the receive beamformer bank of the concentration radio receives an uplink data signal.

11. The system of claim 9 further comprising a plurality of receive beamforming banks and a plurality of transmit beamforming banks at each concentrating node and a plurality of receive beamforming banks and a plurality of transmit beamforming banks at each end node wherein a plurality of independent data streams are communicated across the communication link simultaneously for a termination node for a plurality of subscribers associated with the end node, wherein each data stream is transmitted in the presence of other data streams at a same frequency where the interference from the other data streams is removed by inference cancellation.

12. The system of claim 1, wherein the transmit and receive beamformer banks optimize the uplink communication link despite interference in the communication link.

13. The system of claim 1, wherein the transmit and receive beamformer banks optimize the downlink communication link despite multipath in the communication link.

14. The system of claim 1, wherein the transmit and receive beamformer banks optimize the communication link using pilot signals and/or reference signals with or without data.

15. The system of claim 1 further comprising a plurality of receive beamforming banks at each end of the communication link and a plurality of transmit beamforming banks at each end of the communication link so that a plurality of independent data streams are simultaneously communicated across the communication link, wherein each data stream is transmitted in the presence of other data streams at same frequency where an interference from the other data streams is removed by inference cancellation.

16. The system of claim 1 where each end of the communication link's transmit and receive beamformers, within the beamformer filter bank, self aligns transmit and receive antenna patterns to optimize link performance per subband and subzone.

17. The system of claim 16, wherein a modulation and coding scheme (MCS) is adjusted via downshifting or upshifting to match requirements as determined by a signal to noise ratio and/or signal to interference and noise ratio.

18. The system of claim 1, wherein beams and nulls of each subband may be directed and optimized for different end nodes.

19. The system of claim 1 where beams and nulls of each subzones may be directed and optimized for different end nodes.

20. The system of claim 1 where the beams and nulls of each combination of subband and subzone may be directed and optimized for different end nodes.

21. The system of claim 1 where the beams and nulls of each combination of subband and subzone may be directed and optimized for different end nodes by a scheduler in a media access controller (MAC).

22. The claim of 20, wherein the beams and nulls of each combination of subband and subzone may be directed and optimized for different end nodes by the scheduler in the media access controller (MAC) according to end node Quality of Service (QoS).

23. The claim of 1, wherein the beams and nulls of each combination of subband and subzone may be directed and optimized for different end nodes by the media access controller (MAC) according to QoS as adjusted by any downshifting required to meet QoS in a presence of other node interference.

24. The system of claim 1 where an end node is attached to client devices such as WiFi access points, Ethernet switches, routers, or other client devices implementing backhaul for Ethernet drop applications.

25. The system of claim 1, wherein the at least one transmit beamformer bank of a first radio of the at least two radios is configured to determine a first set of transmit beamforming weights to optimize the communication link to benefit a receiver in a second radio of the at least two radios.

26. The system of claim 25, wherein the at least one receive beamformer bank of the second radio is configured to determine a first set of receive beamforming weights after the first set of transmit beamforming weights have been determined, wherein the first set of receive beamforming weights is configured to optimize the communication link to benefit a receiver in the first radio.

27. The system of claim 1, wherein the transmit beamforming weights and the receive beamforming weights are determined sequentially based on alternating transmission and receipt of data between the at least two radios.

28. The system of claim 1, wherein a radio at the first end and a radio at the second end are configured to perform weight adaptation iteratively for the at least one weight of the transmit beamforming weights and the receive beamforming weights.

29. The system of claim 28, wherein concentrator backhaul radios (CBRs) and terminating backhaul radios (TBRs) at each end of the communication link are configured to sequentially perform the weight adaptation.

30. The system of claim 1, wherein the at least one transmit beamforming weight is further determined based on determining a phase tilt and an amplitude tilt of the respective receive beamforming weight, and wherein the phase tilt and the amplitude tilt is specific to each subcarrier in the subband.

31. A wireless communication system, comprising:
a communication link having a first end and a second end that communicate over reciprocal radio frequency channels, the communication link having at least two radios at each end of the communication link, each radio having a transmit beamformer bank and a receive beamformer bank; and
at least one transmit beamformer bank at each end of the communication link and at least one receive beamformer bank at each end of the communication link that exchange data with each other to transmit data over the communication link;
wherein each beamformer bank is a set of beamformers and each beamformer is configured to process a section of a frequency band of the communication link wherein each section is a subband of the frequency band and two or more subbands span the frequency band,
wherein at least one transmit beamformer of the transmit beamformer bank is configured to use one or more receive beamforming weights to perform transmit beamforming, and wherein at least one receive beamformer of the receive beamformer bank is configured to use the one or more receive beamforming weights to perform receive beamforming,
wherein at least one of the one or more receive beamforming weights and at least one weight of the one or more transmit beamforming weights is a complex weight comprising a phase and an amplitude, and being specific to a subcarrier, and
wherein the at least one of the one or more transmit beamforming weights is based at least on a scaled complex conjugate of a respective receive beamforming weight.

32. The system of claim 31, wherein the radio at the first end of the communication link is a concentrating node and the radio at the second end of the communication link is an end node and each beamformer bank generates $M_{CN}$, $M_{TN}$ spatial beams and spatial nulls where the $M_{CN}$ is a number of antennas at the concentrating node and the $M_{TN}$ is a number of antennas at the end node and a sum of spatial nulls and the spatial beams is equal to M antennas where M is also called degrees of freedom (DOF) of an antenna array.

33. The system of claim 32, wherein if $M_{CN}$ is at least two and if $M_{TN}$ is at least two and a number of data streams is a least two, then by distributing the DOFs between the two ends of the communication link to provide further optimization of a link performance in the presence of non-line of sight propagation and co-channel interference.

34. The system of claim 33 that have a minimum interference cancellation capability bounded by the sum of $M_{CN}-1$ and $M_{TN}-1$.

35. The system of claim 33 that has an interference cancellation capability are bounded by the product of $M_{CN}-1$ and $M_{TN}-1$.

36. The system of claim 33, wherein each end of the communication link requires $O(M^3)$ arithmetic computations, wherein distributing the arithmetic computations among the concentrating node and end nodes results in network capacity optimality while distributing computation complexity among all nodes, results in significant realizability.

37. The system of 36, wherein DM-MIMO provides additional capacity and link speed gains relative to conventional Massive MIMO schemes.

38. The system of claim 33, wherein the system achieves a theoretical maximum imbedded cellular capacity of a wireless network given a target SINR and one or more DM-MIMO parameters.

39. The system of claim 33, wherein the transmit and receive beamformer banks optimize the communication link using pilot signals and/or reference signals with or without data.

40. The system of claim 32, wherein the transmit and receive beamformer banks optimize the communication link in the presence of same frequency interference from other sectors where two or more concentrating nodes are co-located together.

41. The system of claim 32, wherein the transmit and receive beamformer banks optimize the communication link in the presence of same frequency interference from other concentrating radio sites where two or more concentrating radios sites are in a same geographical area where they are close enough to cause intercell interference.

42. The system of claim 32 further comprising a plurality of receive beamforming banks and a plurality of transmit beamforming banks at each concentrating node and a plurality of receive beamforming banks and a plurality of transmit beamforming banks at each end node wherein a plurality of independent data streams are communicated across the communication link simultaneously for the end nodes for a plurality of subscribers associated with the end nodes, wherein each data stream is transmitted in the presence of other data streams at a same frequency where an interference from the other data streams is removed by inference cancellation.

43. The system of claim 31, wherein the transmit and receive beamformer banks optimize the communication link and in combination with a power control algorithm converges a theoretical optimal capacity while minimizing an overall transmit power.

44. The system of claim 31 further comprising a plurality of receive beamforming banks at each end of the communication link and a plurality of transmit beamforming banks at each end of the communication link so that a plurality of independent data streams are simultaneously communicated across the communication link, wherein each data stream is transmitted in the presence of other data streams at same frequency where an interference from the other data streams is removed by inference cancellation.

45. The system of claim 44, wherein the streams are localized to an orthogonal polarization of vertical and horizontal antenna elements, and wherein interference cancellation separates two data streams from interference of other streams.

46. The system of claim 45, wherein the streams are allocated equally across all vertical and horizontal polarizations and wherein the interference cancellation separates the two data streams from the interference of the other stream resulting in the optimal link rate and overall network capacity.

47. The system of claim 31 further comprising a power control process associated with radios and wherein the transmit and receive beamformer banks and the power control process maximizes a capacity of the communication link while using local pilots/reference signals available at the local receivers.

48. The system of claim 31, wherein a radio at the first end and a radio at the second end are configured to perform weight adaptation iteratively for the at least one of the one or more transmit beamforming weights and the at least one or more receive beamforming weights.

49. The system of claim 48, wherein concentrator backhaul radios (CBRs) and terminating backhaul radios (TBRs) at each end of the communication link are configured to sequentially perform the weight adaptation.

50. The system of claim 31, wherein the at least one of the one or more transmit beamforming weights is further determined based on determining a phase tilt and an amplitude tilt of the respective receive beamforming weight, and wherein the phase tilt and the amplitude tilt is specific to each subcarrier in the subband.

* * * * *